US011418806B2

(12) United States Patent
Watson

(10) Patent No.: US 11,418,806 B2
(45) Date of Patent: Aug. 16, 2022

(54) SYSTEMS AND METHODS FOR DECODING AND DISPLAYING IMAGE FRAMES

(71) Applicant: Sony Interactive Entertainment Inc., Tokyo (JP)

(72) Inventor: William S. Watson, Mission Viejo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/097,890

(22) Filed: Nov. 13, 2020

(65) Prior Publication Data

US 2021/0160530 A1    May 27, 2021

Related U.S. Application Data

(60) Provisional application No. 62/941,520, filed on Nov. 27, 2019.

(51) Int. Cl.
| | | |
|---|---|---|
| *H04N 19/517* | (2014.01) | |
| *H04N 19/159* | (2014.01) | |
| *H04N 19/146* | (2014.01) | |
| *H04N 19/172* | (2014.01) | |
| *G06N 20/00* | (2019.01) | |

(52) U.S. Cl.
CPC ........... *H04N 19/517* (2014.11); *G06N 20/00* (2019.01); *H04N 19/146* (2014.11); *H04N 19/159* (2014.11); *H04N 19/172* (2014.11)

(58) Field of Classification Search
CPC .................................................. H04N 19/517
USPC ..................................................... 375/240.16
See application file for complete search history.

(56) References Cited

U.S. PATENT DOCUMENTS

| | | | |
|---|---|---|---|
| 8,516,534 B2 | 8/2013 | Pratt et al. | |
| 8,813,158 B2 | 8/2014 | Pratt et al. | |
| 9,948,959 B2 | 4/2018 | Khatibi et al. | |
| 10,706,890 B2 | 7/2020 | Somanath et al. | |
| 2009/0103617 A1* | 4/2009 | Au | H04N 19/107 375/240.13 |
| 2010/0275237 A1 | 10/2010 | Pratt et al. | |
| 2013/0329813 A1 | 12/2013 | Pratt et al. | |
| 2015/0373378 A1* | 12/2015 | Khatibi | G06T 5/001 348/43 |

(Continued)

FOREIGN PATENT DOCUMENTS

CN          101360246 A      2/2009

OTHER PUBLICATIONS

Liu et al., "Video Frame Synthesis using Deep Voxel Flow", arxiv.org, Cornell University Library, NY, Feb. 8, 2017, XP080747152, DOI: 10.1109/ICCV.2017.478.

(Continued)

*Primary Examiner* — Yulin Sun
(74) *Attorney, Agent, or Firm* — Penilla IP, APC

(57) ABSTRACT

A method for decoding image frames at a client is described. The method includes generating an estimated image frame after receiving an encoded image frame of a stream of encoded image frames. The method further includes decoding the encoded image frame when the encoded image frame is received at a decode interval set for a frame rate of presentation. The method includes using the estimated image frame when a corresponding encoded image frame fails to arrive within the stream for presentation at the frame rate.

21 Claims, 16 Drawing Sheets

(56) References Cited

U.S. PATENT DOCUMENTS

| | | | |
|---|---|---|---|
| 2016/0234519 A1* | 8/2016 | Terada | H04N 19/46 |
| 2019/0066733 A1 | 2/2019 | Somanath et al. | |
| 2021/0056998 A1 | 2/2021 | Somanath et al. | |

OTHER PUBLICATIONS

Kung et al, "Spatial and temporal Error Concealment Techniques for Video Transmission Over Noisy Channels", IEEE Transactions on Circuits and Systems for Video Technology, Inst. of Electrical and Electronics Engineers, US, vol. 16, No. 7, Jul. 1, 2006, pp. 7890802, XP001548832, ISSN: 1051-8215, DOI: 10.1109/TCSVT. 2006.877391, p. 793.

PCT/US2020/060908, PCT/ISA/210, Notification of the International Search Report and the Written Opinion of the International Searching Authority, or the Declaration, International Searching Authority, European Patent Office, NL-2280 HV Rijswijk, dated Jan. 25, 2021.

* cited by examiner (GENERATION OF E-FRAMES FOR EACH P FRAME BASED ON MOTION COMPENSATION)

(GENERATION OF E-FRAMES FOR P-FRAMES 6 & 7 BASED ON MOTION COMPENSATION & MACHINE LEARNING)

(GENERATION OF E-FRAMES FOR P-FRAMES 8 & 9 BASED ON MACHINE LEARNING)

(MACHINE LEARNING AT CLIENT)

(DROP E-FRAME)

(METHOD FOR SWITCHING TO MOTION COMPENSATION AND MACHINE LEARNING OR TO MACHINE LEARNING)

SYSTEMS AND METHODS FOR DECODING AND DISPLAYING IMAGE FRAMES

CLAIM OF PRIORITY

This application claims the benefit of and priority, under 35 U.S.C. § 119(e), to U.S. Provisional Patent Application No. 62/941,520, filed on Nov. 27, 2019, and titled "Systems and Methods for Decoding and Displaying Image Frames", which is hereby incorporated by reference in its entirety.

FIELD

The present disclosure relates to systems and methods for decoding and displaying image frames.

BACKGROUND

A video game, these days, is accessed over a computer network. For example, Fortnite™ game is played by many players from different parts of the world. One player controls a first avatar and another player controls a second avatar. Each avatar collects weapons and cuts wood during the game. The avatars are then forced to be confined within a virtual circle. If the avatars are left behind outside the virtual circle, the avatars virtually die in the game. When both the avatars are in the circle, they find each other and then battle against each other with their weapons. Only one of the two avatars survive.

Because the video game is accessed via the computer network, image frames for the video game are sent via the computer network. However, one or more of the image frames may not be received at a client.

SUMMARY

Embodiments of the present disclosure provide systems and methods for decoding and displaying image frames when some encoded image frames are not received at a client device.

Other aspects of the present disclosure will become apparent from the following detailed description, taken in conjunction with the accompanying drawings, illustrating by way of example the principles of embodiments described in the present disclosure.

In an embodiment, the methods described herein include predicting a next estimated frame based on changes to previously received one or more encoded frames. By predicting the next estimated frame, frames are displayed faster than encoding, transmitting, decoding, and displaying image frames received from one or more server nodes.

In one embodiment, the methods described herein include applying motion compensation to an encoded frame to predict or estimate what the next estimated frame or an area within the next estimated frame will be. The prediction or estimation provides a head start in decoding the next estimated frame. If another encoded frame corresponding to the next estimated frame is received, the next estimated frame is discarded and the other encoded frame is decoded without loss in time.

In an embodiment, the next estimated image frame is displayed before the other encoded frame is received by the client device.

In an embodiment, a method for decoding image frames at a client is described. The method includes generating an estimated image frame after receiving an encoded image frame of a stream of encoded image frames. The method further includes decoding the encoded image frame when the encoded image frame is received at a decode interval set for a frame rate of presentation. The method includes using the estimated image frame when a corresponding encoded image frame fails to arrive within the stream for presentation at the frame rate.

In one embodiment, a client device is described. The client device is used for decoding image frames at a client. The client device includes a processor. The processor generates an estimated image frame after receiving an encoded image frame of a stream of encoded image frames. The processor decodes the encoded image frame of the stream when the encoded image frame is received at a decode interval set for a frame rate of presentation. The processor uses the estimated image frame when a corresponding encoded image frame fails to arrive within the stream for presentation at the frame rate. The client device includes a memory device coupled to the processor.

In an embodiment, a computer-readable medium containing program instructions for decoding image frames at a client, is described. Execution of the program instructions by one or more processors of a computer system causes the one or more processors to carry a plurality of operations. The plurality of operations include generating an estimated image frame after receiving an encoded image frame of a stream of encoded image frames. The plurality of operations further include decoding the encoded image frame when the encoded image frame is received at a decode interval set for a frame rate of presentation. The plurality of operations include using the estimated image frame when a corresponding encoded image frame fails to arrive within the stream for presentation at the frame rate.

Some advantages of herein described systems and methods for decoding and displaying image frames include maintaining a frame rate of display of images on the client device. Some encoded image frames sent from a server are lost over the computer network. The client device estimates information from encoded image frames that have been previously arrived to generate estimated image frames. Also, the client device estimates information from previously generated estimated image frames to generate the estimated image frames. When the encoded image frames are not received, the estimated image frames are decoded and then displayed on the client device. This facilitates maintaining the frame rate of display at the client device.

BRIEF DESCRIPTION OF THE DRAWINGS

Various embodiments of the present disclosure are best understood by reference to the following description taken in conjunction with the accompanying drawings in which.

DETAILED DESCRIPTION

Systems and methods for decoding and displaying image frames are described. It should be noted that various embodiments of the present disclosure are practiced without some or all of these specific details. In other instances, well known process operations have not been described in detail in order not to unnecessarily obscure various embodiments of the present disclosure.

Figure 1:
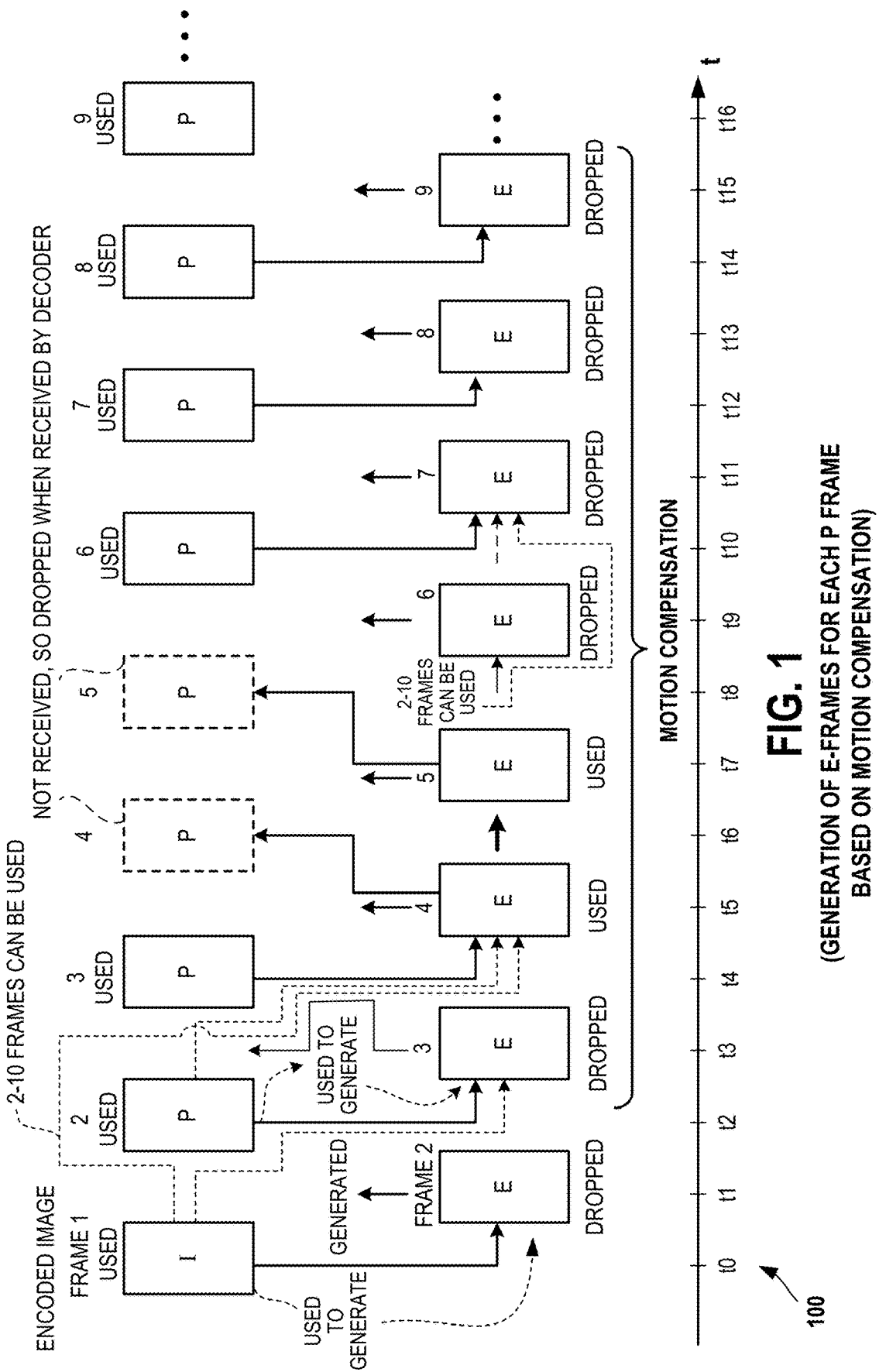
FIG. 1 is a diagram to illustrate a system for generation of an estimated frame (E-frame) based on motion compensation for facilitating a play of a game for each received frame for a game.

FIG. 1 is a diagram to illustrate a system 100 for generation of an estimated frame (E-frame) based on motion compensation for facilitating a play of a game for each received frame for the game. The system 100 includes an intra-coded frame (I-frame), and multiple predicted frames (P-frames) for facilitating the play of the game. A frame is sometimes referred to herein as an image frame or a slice or a scene frame.

As an example, an I-frame is a complete image, such as a joint photographic experts group (JPG) image file or a bitmap (BMP) image file. As an example, a P-frame holds only the changes in the image from the previous frame. For example, in a scene where a car moves across a stationary background, only the car's movements are encoded. An encoder of a server system does not need to store unchanging background pixels in the P-frame, thus saving space. Each of I-frame and P-frame is an encoded image frame that is encoded by the encoder of the server system. Examples of an encoding protocol that is applied by the encoder include an advanced video coding (AVC) protocol. The AVC protocol is a video compression standard based on block-oriented, motion-compensated integer-discrete cosine transform (integer-DCT) coding and is sometimes referred to herein as an H.264 protocol or an motion pictures experts group-4 (MPEG-4) Part 10 protocol.

The system 100 further includes a time line or a time axis that indicates a time t of reception of each of the frames at a client device. The system 100 also includes a series of E-frames for facilitating the play of the game. An example of the system 100 is the client device, such as a desktop computer, or a laptop computer, or a smart phone, or a game console, or a smart television, or a television, or a head-mounted display (HMD), or a tablet, or a phablet, or a combination of the game console and the television, or a combination of the game console and the HMD, or a combination of the game console, the HMD, and a hand-held controller, or a combination of the game console, the television, and the hand-held controller.

The client device receives the I-frame, which is designated as an I-frame 1, at a time t0. The client device further receives a P-frame 2 at a time t2. The client device then receives a P-frame 3 at a time t4. The client device thereafter does not receive a P-frame 4 at a time t6. For example, the P-frame 4 is lost in a computer network and does not reach the client device from the server system. As another example, the P-frame 4 is not sent from the server system because of malfunction or nonoperation of the server system. In a similar manner, the client device does not receive a P-frame 5 at a time t8. The client device receives P-frames 6, 7, 8, and 9 at respective times t10, t12, t14, and t16. Frames that are received at the client device are illustrated using solid lines and frames that are not received at the client device are illustrated using dashed lines. Examples of the computer network include a wide area network (WAN) and a local area network (LAN). The WAN can be the Internet and the LAN can be an Intranet.

The client device generates an E-frame 2 from the I-frame 1 at a time t1. For example, at the time t1, the client device parses the I-frame 1 to obtain information stored within the I-frame 1 and applies the motion compensation to the information to generate the E-frame 2. To illustrate, the client device parses the I-frame 1 to identify information stored within the I-frame 1 to determine that a virtual object, such as a game character, is at a position A within the I-frame 1. The client device executes the motion compensation, such as a motion compensation computer software program, stored at the client device to apply laws of physics to determine that in the E-frame 2, the game character is to be displayed at a position B. The position B is different from the position A. For example, the position B is to the right of position A or to the left of position A or above the position A or below the position A. An example of the motion compensation is a computer software program that is executed to determine a next location, or a next orientation, or a combination thereof of a virtual object. Examples of a virtual object include the game character, a virtual weapon, a virtual toy, a virtual ball, a virtual user, a game avatar, a virtual hand, a virtual arm, a virtual leg, a virtual vehicle, etc. A processor of the client device stores the E-frame 2 within a memory device of the client device.

Examples of a processor, as used herein, include a central processing unit (CPU), a microprocessor, a microcontroller, a controller, an application specific integrated circuit (ASIC), and a programmable logic device (PLD). A memory device, as used herein, in one embodiment, is a device from which data is read or to which the data is written. Examples of the memory device include a read-only memory (ROM) device, or a random access memory (RAM) device, or a combination thereof. To illustrate, the memory device includes a flash memory, a cache, or a redundant array of independent disks (RAID).

Upon receiving the I-frame 1, a display device of the client device displays the I-frame 1. Examples of a display device, as used herein, include a liquid crystal display (LCD) device, a light emitting diode display (LED) device, and a plasma display device. To illustrate, the display device includes a display screen of the HMD or of the television.

After generating the E-frame 2, the client device determines whether the P-frame 2 is received at the client device. Upon determining that the P-frame 2 is received, the client device drops the E-frame 2. For example, the processor of the client device deletes the E-frame 2 from the memory device of the client device in response to determining that the P-frame 2 is received.

The P-frame 2 has the same or similar information as that of the E-frame 2. For example, the P-frame 2 has the next location or orientation or a combination thereof of the game character. To illustrate, the P-frame 2 has the position B of the game character. Upon receiving the P-frame 2, the P-frame 2 is displayed by the display device of the client device.

The client device generates an E-frame 3 from the P-frame 2 at a time t3. For example, at the time t3, the client device parses the P-frame 2 to obtain information stored within the P-frame 2 and applies the motion compensation to the information to generate the E-frame 3. To illustrate, the client device parses the information stored within the P-frame 2 to determine that the game character is at the position B within the P-frame 2. The client device executes the motion compensation computer software program stored at the client device to apply laws of physics to determine that in the E-frame 3, the game character is to be displayed at a position C. The position C is different from the position B. For example, the position C is to the right of position B or to the left of position B or above the position B or below the position B. The processor of the client device stores the E-frame 3 within the memory device of the client device.

After generating the E-frame 3, the client device determines whether the P-frame 3 is received at the client device. Upon determining that the P-frame 3 is received, the client device drops the E-frame 3. For example, the processor of the client device deletes the E-frame 3 from the memory device of the client device in response to determining that the P-frame 3 is received.

The P-frame 3 has the same or similar information as that of the E-frame 3. For example, the P-frame 3 has the next location or orientation or a combination thereof of the game character compared to the location of the game character in the P-frame 2. To illustrate, the P-frame 3 has the position C of the game character. Upon receiving the P-frame 3, the P-frame 3 is displayed by the display device of the client device.

The client device generates an E-frame 4 from the P-frame 3 at a time t5. For example, at the time t5, the client device parses the P-frame 3 to identify information stored within the P-frame 3 and applies the motion compensation to the information to generate the E-frame 4. To illustrate, the client device parses the P-frame 3 to identify the information stored within the P-frame 3 to determine that the game character is at the position C within the P-frame 3. The client device executes the motion compensation computer software program stored at the client device to apply laws of physics to determine that in the E-frame 4, the game character is to be displayed at a position D. The position D is different from the position C. For example, the position D is to the right of position C or to the left of position C or above the position C or below the position C. The processor of the client device stores the E-frame 4 within the memory device of the client device.

After generating the E-frame 4, the client device determines whether the P-frame 4 is received at the client device. Upon determining that the P-frame 4 is not received, the client device does not drop the E-frame 4. For example, the processor of the client device does not delete the E-frame 4 from the memory device of the client device in response to determining that the P-frame 4 is not received. Rather, the display device of the client device displays the E-frame 4 to achieve a pre-determined frame rate of display of image frames on the display device of the client device.

The E-frame 4 is an approximation of changes likely to occur in the P-frame 4 that is not received at the client device. For example, the E-frame 4 has the same or similar information as that of the P-frame 4. To illustrate, both the E-frame 4 and the P-frame 4 have the next location or orientation or a combination thereof of the game character compared to the location of the game character in the P-frame 3. To further illustrate, both the P-frame 4 and the E-frame 4 have the position D of the game character.

It should be noted that if the client device receives the P-frame 4 once the E-frame 4 is displayed, the client device drops the P-frame 4. For example, the processor of the client device deletes or removes the P-frame 4 from the memory device of the client device and the display device of the client device does not display the P-frame 4. As another example, a decoder of the client device does not decode the P-frame 4 and the processor of the client device deletes the P-frame 4. As yet another example, the decoder of the client device deletes the P-frame 4.

The client device generates an E-frame 5 from the E-frame 4 at a time t7. For example, at the time t7, the client device applies the motion compensation to information stored within the E-frame 4 to generate the E-frame 5. To illustrate, the client device parses the information stored within the E-frame 4 to determine that the game character is at the position D within the E-frame 4. The client device executes the motion compensation computer software program stored at the client device to apply laws of physics to determine that in the E-frame 5, the game character is to be displayed at a position E. The position E is different from the position D. For example, the position E is to the right of position D or to the left of position D or above the position D or below the position D. The processor of the client device stores the E-frame 5 within the memory device of the client device.

After generating the E-frame 5, the client device determines whether the P-frame 5 is received at the client device. Upon determining that the P-frame 5 is not received, the client device does not drop the E-frame 5. For example, the processor of the client device does not delete the E-frame 5 from the memory device of the client device in response to determining that the P-frame 5 is not received. Rather, the display device of the client device displays the E-frame 5 to achieve the pre-determined frame rate of display of image frames on the display device of the client device.

The E-frame 5 is an approximation of changes likely to occur in the P-frame 5 that is not received at the client device. For example, the E-frame 5 has the same or similar information as that of the P-frame 5. For example, both the E-frame 5 and the P-frame 5 have the next location or orientation or a combination thereof of the game character compared to the location of the game character in the P-frame 4. To further illustrate, both the E-frame 5 and the P-frame 5 have the position E of the game character.

It should be noted that if the client device receives the P-frame 5 once the E-frame 5 is displayed, the client device drops the P-frame 5. For example, the processor of the client device deletes or removes the P-frame 5 from the memory device of the client device and the display device of the client device does not display the P-frame 5. As another example, the decoder of the client device does not decode the P-frame 5 and the processor of the client device deletes the P-frame 5. As yet another example, the decoder of the client device deletes the P-frame 5.

The client device generates an E-frame 6 from the E-frame 5 at a time t9. For example, at the time t9, the client device applies the motion compensation to the information stored within the E-frame 5 to generate the E-frame 6. To illustrate, the client device determines that the game character is at the position E within the E-frame 5. The client device executes the motion compensation computer software program stored at the client device to apply laws of physics to determine that in the E-frame 6, the game character is to be displayed at a position F. The position F is different from the position E. For example, the position F is to the right of position E or to the left of position E or above the position E or below the position E. The processor of the client device stores the E-frame 6 within the memory device of the client device.

After generating the E-frame 6, the client device determines whether the P-frame 6 is received at the client device. Upon determining that the P-frame 6 is received, the client device drops the E-frame 6. For example, the processor of the client device deletes the E-frame 6 from the memory device of the client device in response to determining that the P-frame 6 is received.

The P-frame 6 has the same or similar information as that of the E-frame 6. For example, the P-frame 6 has the next location or orientation or a combination thereof of the game character compared to the location of the game character in the E-frame 6. To illustrate, the P-frame 6 has the position F of the game character. Upon receiving the P-frame 6, the P-frame 6 is displayed by the display device of the client device.

The client device generates an E-frame 7 from the P-frame 6 at a time t11. For example, at the time t11, the client device parses the P-frame 6 to obtain information stored within the P-frame 6 and applies the motion compensation to the information to generate the E-frame 7. To illustrate, the client device parses the P-frame 6 to identify the information stored within the P-frame 6 to determine that the game character is at the position F within the P-frame 6. The client device executes the motion compensation computer software program stored at the client device to apply laws of physics to determine that in the E-frame 7, the game character is to be displayed at a position G. The position G is different from the position F. For example, the position G is to the right of position F or to the left of position F or above the position F or below the position F. The processor of the client device stores the E-frame 7 within the memory device of the client device.

After generating the E-frame 7, the client device determines whether the P-frame 7 is received at the client device. Upon determining that the P-frame 7 is received, the client device drops the E-frame 7. For example, the processor of the client device deletes the E-frame 7 from the memory device of the client device in response to determining that the P-frame 7 is received.

The P-frame 7 has the same or similar information as that of the E-frame 7. For example, the P-frame 7 has the next location or orientation or a combination thereof of the game character compared to the location of the game character in the P-frame 6. To illustrate, the P-frame 7 has the position G of the game character. Upon receiving the P-frame 7, the P-frame 7 is displayed by the display device of the client device.

The client device generates an E-frame 8 from the P-frame 7 at a time t13. For example, at the time t13, the client device parses the P-frame 7 to obtain information stored within the P-frame 7 and applies the motion compensation to the information to generate the E-frame 8. To illustrate, the client device parses the P-frame 7 to identify the information stored within the P-frame 7 to determine that the game character is at the position G within the P-frame 7. The client device executes the motion compensation computer software program stored at the client device to apply laws of physics to determine that in the E-frame 8, the game character is to be displayed at a position H. The position H is different from the position G. For example, the position H is to the right of position G or to the left of position G or above the position G or below the position G. The processor of the client device stores the E-frame 8 within the memory device of the client device.

After generating the E-frame 8, the client device determines whether the P-frame 8 is received at the client device. Upon determining that the P-frame 8 is received, the client device drops the E-frame 8. For example, the processor of the client device deletes the E-frame 8 from the memory device of the client device in response to determining that the P-frame 8 is received.

The P-frame 8 has the same or similar information as that of the E-frame 8. For example, the P-frame 8 has the next location or orientation or a combination thereof of the game character compared to the location of the game character in the P-frame 7. To illustrate, the P-frame 8 has the position H of the game character. Upon receiving the P-frame 8, the P-frame 8 is displayed by the display device of the client device.

The client device generates an E-frame 9 from the P-frame 8 at a time t15. For example, at the time t15, the client device parses the P-frame 8 to obtain information stored within the P-frame 8 and applies the motion compensation to the information to generate the E-frame 9. To illustrate, the client device parses the P-frame 8 to identify the information stored within the P-frame 8 to determine that the game character is at the position H within the P-frame 8. The client device executes the motion compensation computer software program stored at the client device to apply laws of physics to determine that in the E-frame 9, the game character is to be displayed at a position I. The position I is different from the position H. For example, the position I is to the right of position H or to the left of position H or above the position H or below the position H. The processor of the client device stores the E-frame 9 within the memory device of the client device.

After generating the E-frame 9, the client device determines whether the P-frame 9 is received at the client device. Upon determining that the P-frame 9 is received, the client device drops the E-frame 9. For example, the processor of the client device deletes the E-frame 9 from the memory device of the client device in response to determining that the P-frame 9 is received.

The P-frame 9 has the same or similar information as that of the E-frame 9. For example, the P-frame 9 has the next location or orientation or a combination thereof of the game character compared to the location of the game character in the P-frame 8. To illustrate, the P-frame 9 has the position I of the game character. Upon receiving the P-frame 9, the P-frame 9 is displayed by the display device of the client device.

It should be noted that the times t0-t16 along the time axis are consecutive. For example, the time t1 is after the time t0, the time t2 is after the time t1, the time t3 is after the time t2, the time t4 is after the time t3, the time t5 is after the time t4, the time t6 is after the time t5, the time t7 is after the time t6, the time t8 is after the time t7, the time t9 is after the time t8, the time t10 is after the time t9, the time t11 is after the time t10, the time t12 is after the time t11, the time t13 is after the time t12, the time t14 is after the time t13, the time t15 is after the time t14, and the time t16 is after the time t15.

In an embodiment, the client device applies the motion compensation to more than one virtual object within the I-frame 1. For example, the client device applies the motion compensation to a first virtual object and a second virtual object.

In an embodiment, the client device uses more than one previous frame to generate information for a next frame. For example, the client device applies the information within the E-frames 4 and 5 to generate the E-frame 6. As another example, the client device applies the information within the I-frame 1, the P-frame 2, and the P-frame 3 to generate the E-frame 4. As another example, the client device applies the information within the P-frame 2 and the P-frame 3 to generate the E-frame 4. As another example, the client device applies the information within the I-frame 1 and the P-frame 2 to generate the E-frame 3.

In one embodiment, the terms location of a virtual object and position of the virtual object are used herein simultaneously.

In one embodiment, it takes less time for the client device to generate the E-frame 4 and display the E-frame 4 than a sum of an amount of time taken for the server system to encode one or more image frames to generate the P-frame 4 and send the P-frame 4 via the computer network to the client device and an amount of time taken by the client device to decode the P-frame 4 and display the P-frame 4. Similarly, it takes a lower amount of time for the client device to generate the E-frame 5 and display the E-frame 5 than a sum of an amount of time taken for the server system to encode one or more image frames to generate the P-frame 5 and send the P-frame 5 via the computer network to the client device and an amount of time taken by the client device to decode the P-frame 5 and display the P-frame 5.

Figure 2A:
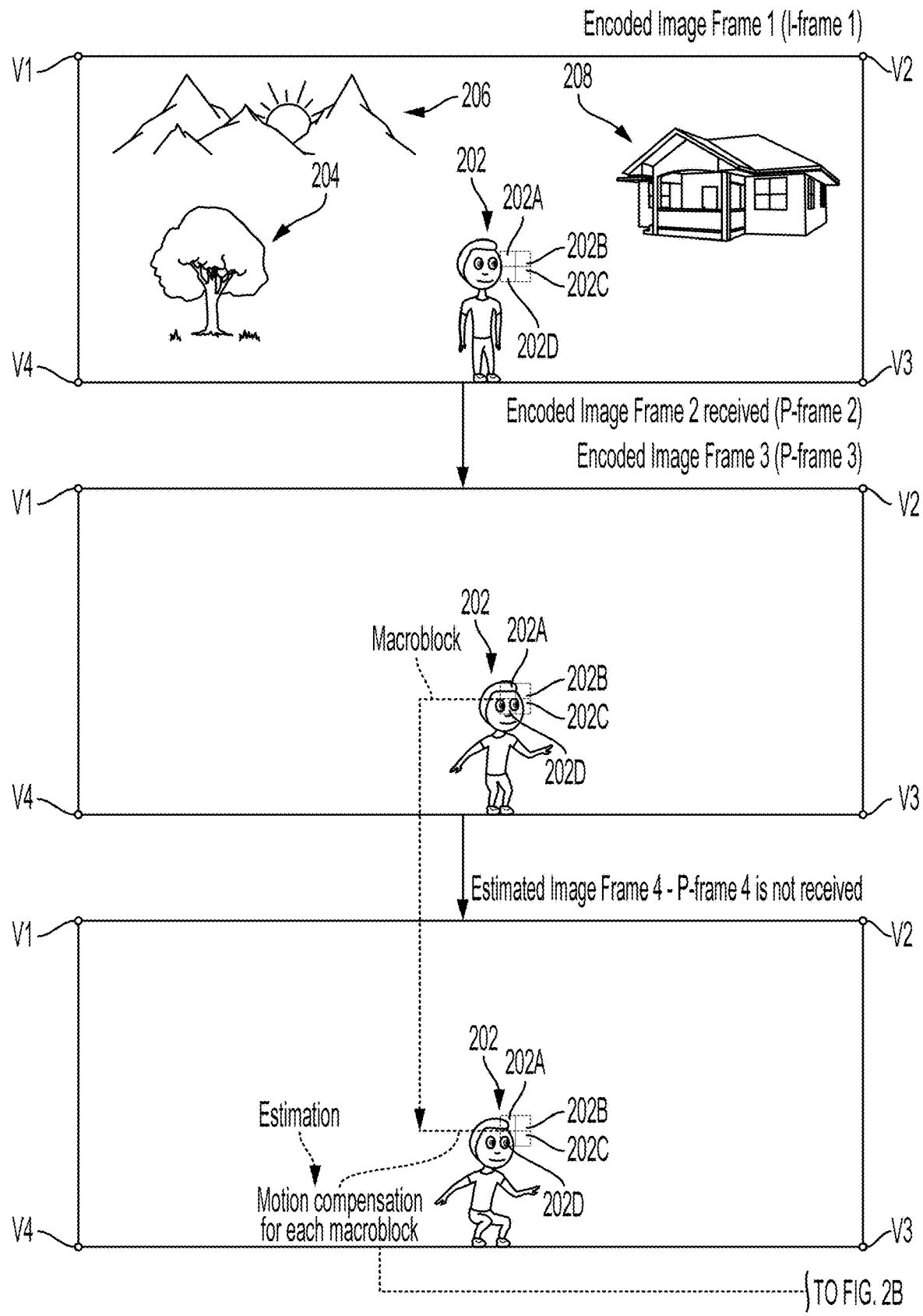
FIG. 2A is a diagram of an embodiment of an I-frame 1, a P-frame 2, a P-frame 3, and an E-frame 4 to illustrate application of the motion compensation to generate the E-frame 4.

FIG. 2A is a diagram of an embodiment of the I-frame 1, the P-frame 2, the P-frame 3, and the E-frame 4 to illustrate application of the motion compensation to generate the E-frame 4. The I-frame 1 includes a virtual object 202, a virtual object 204, a virtual object 206, and a virtual object 208. The virtual object 202 is a game character, the virtual object 204 is a virtual tree, the virtual object 206 includes a combination of virtual mountains and a virtual sun, and the virtual object 208 is a virtual house.

The server system generates the P-frame 2 from the information within the P-frame 1 and generates the P-frame 3 from the information within the P-frame 2. The P-frame 2 includes the virtual object 202 and the P-frame 3 includes the virtual object 202.

There is a change in a position of the virtual object 202 in the P-frame 3 compared to a position of the virtual object 202 in the P-frame 2 and the position of the virtual object 202 in the P-frame 2 changes compared to a position of the virtual object 202 in the I-frame 1. For example, in the P-frame 3, the virtual object 202 bends compared to the virtual object 202 in the P-frame 2 and the virtual object 202 bends in the P-frame 2 compared to the virtual object 202 in the I-frame 1. Each of the I-frame 1, the P-frame 2, and the P-frame 3 includes multiple macroblocks 202A, 202B, 202C, and 202D.

As an example, a macroblock is a matrix of pixels of a frame, such as a P-frame or an E-frame or an I-frame or a B-frame. For example, the macroblock is a 16×16 matrix of pixels or a 4×4 matrix of pixels of the frame. The macroblock is located at the same location within each frame. For example, the macroblock is located at a corner of the I-frame 1, at the same corner of the P-frame 2, and at the same corner of the E-frame 2. Example of the corner include a top left corner, a top right corner, a bottom left corner, and a bottom right corner. Information within the macroblock changes with a change in the frame, e.g., a change from the I-frame 1 to the P-frame 2 or a change from the I-frame 1 to the E-frame 2. To illustrate, a macroblock of each of the E-frame, the I-frame and the B-frame is located at the same (X, Y) position from a vertex of the frame. The frame has a rectangular shape and has four vertices.

As an example, each frame, described herein, can be segmented into sequences of macroblocks called segments or portions. The encoder encodes each of the macroblocks and estimation computer software programs, such as the motion compensation and machine learning, described below, are applied to each of the macroblocks.

Each macroblock 202A-202D includes information about the virtual object 202. For example, the macroblock 202A includes a first portion of a head of the virtual object 202, the macroblock 202B includes a second portion of the head, the macroblock 202C includes a third portion of the head, and the macroblock 202D includes a fourth portion of the head.

The E-frame 4 includes the virtual object 202 and the macroblocks 202A-202D. The client device applies the motion compensation to each of the macroblocks 202A-202D of the P-frame 3 to determine positions of the first through fourth portions of the head within the macroblocks 202A-202D within the E-frame 4. For example, the virtual object 202 bends more in the E-frame 4 compared to a position of the virtual object 202 in the P-frame 3. To illustrate, in the macroblock 202A of the E-frame 4, a lower amount of the head is included compared to an amount of the first portion of the head within the macroblock 202A of the P-frame 3. Also, in the macroblock 202B of the E-frame 4, a lower amount of the head is included compared to an amount of the second portion of the head within the macroblock 202B of the P-frame 3. In the macroblock 202C of the E-frame 4, a different portion of the head is included compared to the third portion of the head included within the macroblock 202C of the P-frame 3. Also, in the macroblock 202D of the E-frame 4, a different portion of the head is included compared to the fourth portion of the head within the macroblock 202D of the P-frame 3.

Figure 2B:
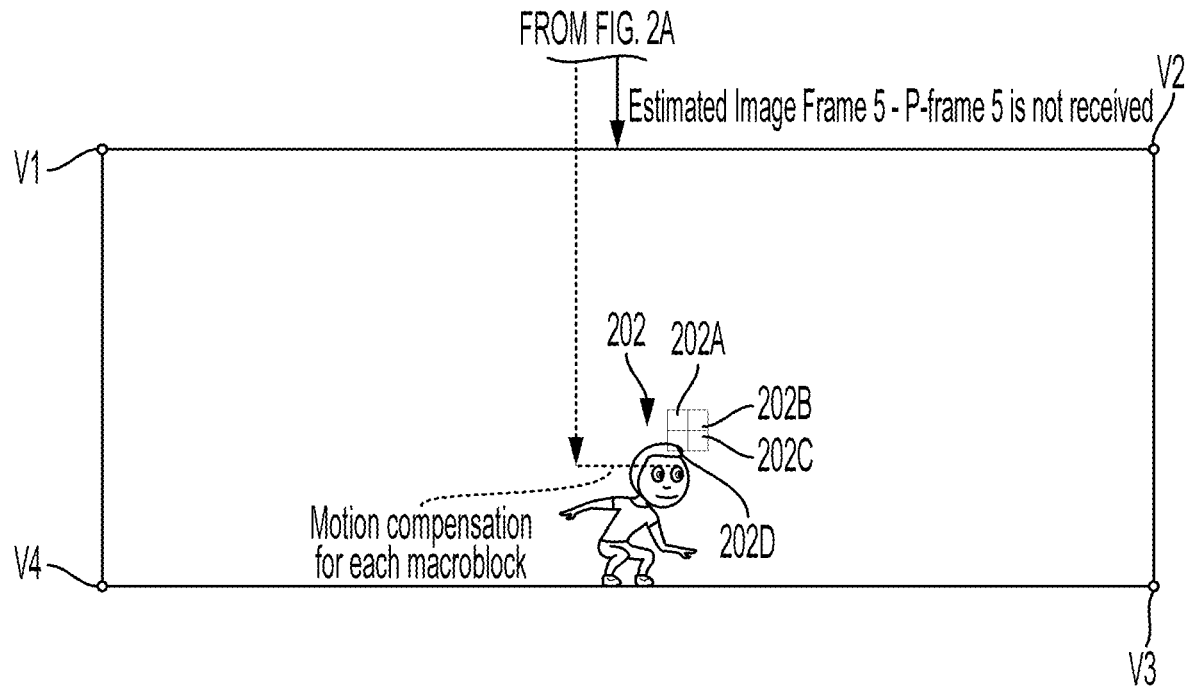
FIG. 2B is a diagram of an embodiment of an E-frame 5.

FIG. 2B is a diagram of an embodiment of the E-frame 5. The E-frame 5 includes the virtual object 202 and the macroblocks 202A-202D. The client device applies the motion compensation to each of the macroblocks 202A-202D of the E-frame 4 to determine positions of the first through fourth portions of the head within the macroblocks 202A-202D within the E-frame 5. For example, the virtual object 202 bends more in the E-frame 5 compared to a position of the virtual object 202 in the E-frame 4. To illustrate, in the macroblock 202A of the E-frame 5, a lower amount of the head is included compared to an amount of the head within the macroblock 202A of the E-frame 4. Also, in the macroblock 202B of the E-frame 5, a lower amount of the head is included compared to an amount of the head within the macroblock 202B of the E-frame 4. In the macroblock 202C of the E-frame 5, a lower amount of the head is included compared to an amount of the head included within the macroblock 202C of the E-frame 4. Also, in the macroblock 202D of the E-frame 5, a different portion of the head is included compared to the portion of the head within the macroblock 202A of the E-frame 4.

Each of the I-frame 1, the P-frame 2, the P-frame 3, and the E-frame 4 is represented by a rectangular shape having four vertices V1, V2, V3, and V4. Each macroblock 202A-202D is at the same (X, Y) position from any of the vertices V1-V4. For example, the macroblock 202A is at a position (X1, Y1) from the vertex V1 in each of the I-frame 1, the P-frame 2, the P-frame 3, and the E-frame 4, where X1 is a distance along a horizontal axis of the frame and Y1 is a distance along a vertical axis of the frame, and the horizontal axis is perpendicular to the vertical axis.

Figure 3:
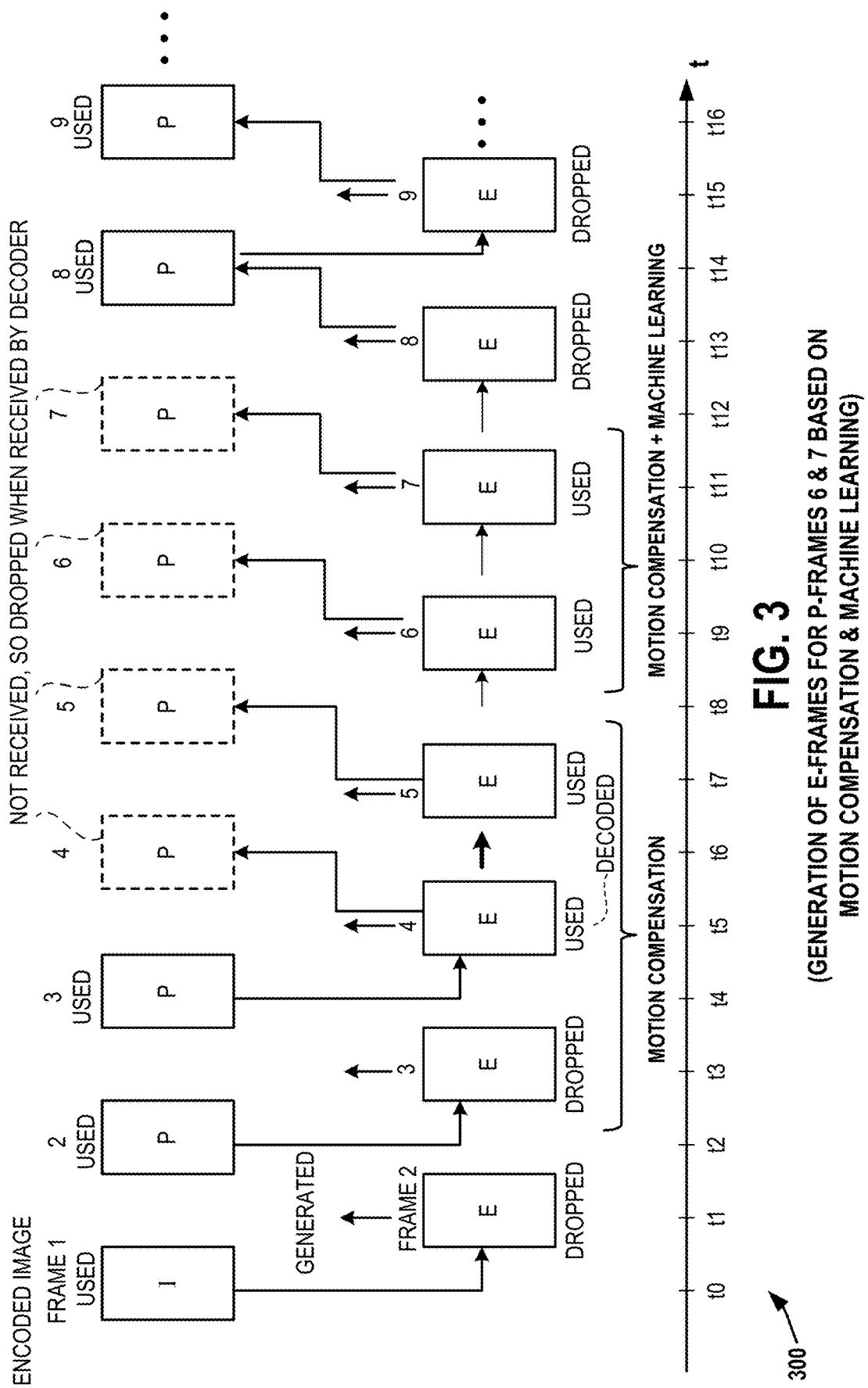
FIG. 3 is a diagram of an embodiment of a system to illustrate generation of E-frames 6 and 7 based on the motion compensation and machine learning.

FIG. 3 is a diagram of an embodiment of a system 300 to illustrate generation of the E-frames 6 and 7 based on the motion compensation and the machine learning. The system 300 is the same in structure and function as the system 100 except in the system 300, the P-frames 6 and 7 are not received, and the motion compensation and the machine learning are used to generate the E-frames 6 and 7.

The E-frames 2-5 are generated in the same manner as described above with reference to FIG. 1. The client device generates the E-frame 6 from the E-frame 5. The client device applies the motion compensation and the machine learning to the information within the E-frame 5 to generate the E-frame 6. To illustrate, the client device determines that the game character is at the position E within the E-frame 5. The client device executes the motion compensation computer software program stored at the client device to apply laws of physics to determine that in the E-frame 6, the game character is to be displayed at the position F. Also, the client device applies the machine learning to determine that the game character is holding a virtual object while at the position F to generate the E-frame 6. The game character is not holding the virtual object in the E-frame 5. The processor of the client device stores the E-frame 6 within the memory device of the client device.

As an example, the machine learning is a computer software program that relies on data patterns, such as training data, and applies statistical methods to the data patterns to generate an inference or a model. There are no explicit software instructions executed in the machine learning. The machine learning is a part of artificial intelligence (AI).

As another example, the machine learning is the computer software program that is generated by the processor of the client device based on game data collected from multiple user accounts. Multiple users, such as game players, play a game to generate a pattern of game play. The pattern is recognized or learned by the processor of the client device to estimate or determine an action that will be performed by a user that is currently playing the game and generate a game state based on the action. To illustrate, if multiple users play the game so that a virtual user grabs a virtual ball and throws the virtual ball to a virtual lama during a stage of the game, the client device will determine that it is more likely than not that during the stage that the user who is currently playing the game will control a virtual user to grab the virtual ball and throw the virtual ball to the virtual lama. As another illustration, if multiple users play the game so that the virtual user instead of throwing the virtual ball to the virtual lama during a stage of the game tosses the virtual ball in virtual air, the client device will determine that it is more likely than not that during the stage the user who is currently playing the game will control the virtual user to toss the virtual ball in the virtual air.

After generating the E-frame 6, the client device determines whether the P-frame 6 is received at the client device. Upon determining that the P-frame 6 is not received, the client device does not drop the E-frame 6. For example, the processor of the client device does not delete the E-frame 6 from the memory device of the client device in response to determining that the P-frame 6 is not received. Rather, the display device of the client device displays the E-frame 6 to achieve the pre-determined frame rate of display of image frames on the display device of the client device.

The E-frame 6 is an approximation of changes likely to occur in the P-frame 6 that is not received at the client device. For example, the E-frame 6 has the same or similar information as that of the P-frame 6. To illustrate, both the E-frame 6 and the P-frame 6 have the next location or orientation or a combination thereof of the game character compared to the location of the game character in the P-frame 5 and has one or more virtual objects that are not present in the P-frame 5. To further illustrate, both the E-frame 6 and the P-frame 6 have the position F of the game character.

It should be noted that if the client device receives the P-frame 6 once the E-frame 6 is displayed, the client device drops the P-frame 6. For example, the processor of the client device deletes or removes the P-frame 6 from the memory device of the client device and the display device of the client device does not display the P-frame 6. As another example, the decoder of the client device does not decode the P-frame 6 and the processor of the client device deletes the P-frame 6. As yet another example, the decoder of the client device deletes the P-frame 6.

The client device generates an E-frame 7 from the E-frame 6. The client device applies the motion compensation and the machine learning to the information within the E-frame 6 to generate the E-frame 7. To illustrate, the client device determines that the game character is at the position F within the E-frame 6 and the virtual object held by the game character is at a position m. The client device executes the motion compensation computer software program stored at the client device to apply laws of physics to determine that in the E-frame 7, the game character is to be displayed at the position G and the virtual object held by the game character is to be displayed at a position n. The position n is different from the position m. For example, the position n is to the right of or left of or above or below the position m. Also, the client device applies the machine learning to determine that another game character enters a virtual scene in which the game character is at the position G and is holding the virtual object to generate the E-frame 7. The processor of the client device stores the E-frame 7 within the memory device of the client device.

After generating the E-frame 7, the client device determines whether the P-frame 7 is received at the client device. Upon determining that the P-frame 7 is not received, the client device does not drop the E-frame 7. For example, the processor of the client device does not delete the E-frame 7 from the memory device of the client device in response to determining that the P-frame 7 is not received. Rather, the display device of the client device displays the E-frame 7 to achieve the pre-determined frame rate of display of image frames on the display device of the client device.

The E-frame 7 is an approximation of changes likely to occur in the P-frame 7 that is not received at the client device. For example, the E-frame 7 has the same or similar information as that of the P-frame 7. To illustrate, both the E-frame 7 and the P-frame 7 have the next location or orientation or a combination thereof of the game character compared to the location of the game character in the P-frame 6 and has one or more virtual objects that are not present in the P-frame 6. To further illustrate, both the E-frame 7 and the P-frame 7 have the position G of the game character.

It should be noted that if the client device receives the P-frame 7 once the E-frame 7 is displayed, the client device drops the P-frame 7. For example, the processor of the client device deletes or removes the P-frame 7 from the memory device of the client device and the display device of the client device does not display the P-frame 7. As another example, the decoder of the client device does not decode the P-frame 7 and the processor of the client device deletes the P-frame 7. As yet another example, the decoder of the client device deletes the P-frame 7.

In one embodiment, the client device determines whether a first pre-determined number of frames, such as the two P-frames 4 and 5, have not been received consecutively from the server system for facilitating the play of the game. In response to determining that the first pre-determined number of frames have not been received consecutively, the client device applies the machine learning and the motion compensation to generate the E-frames 6 and 7. The first pre-determined number of frames is sometimes referred to herein as a pre-determined threshold.

In an embodiment, the client device determines whether a first pre-determined amount of time has passed since a first frame, such the P-frame 4, in a consecutive series of frames, such as the P-frames 4 and 5, has not been received by the client device from the server system. Upon determining that the first pre-determined amount of time has passed, the client device applies the motion compensation and the machine learning to generate the E-frames 6 and 7.

In one embodiment, it takes less time for the client device to generate the E-frame 5 and display the E-frame 5 than a sum of an amount of time taken for the server system to encode one or more image frames to generate the P-frame 5 and send the P-frame 5 via the computer network to the client device and an amount of time taken by the client device to decode the P-frame 5 and display the P-frame 5. Similarly, it takes a lower amount of time for the client device to generate the E-frame 6 and display the E-frame 6 than a sum of an amount of time taken for the server system to encode one or more image frames to generate the P-frame 6 and send the P-frame 6 via the computer network to the client device and an amount of time taken by the client device to decode the P-frame 6 and display the P-frame 6.

Figure 4:
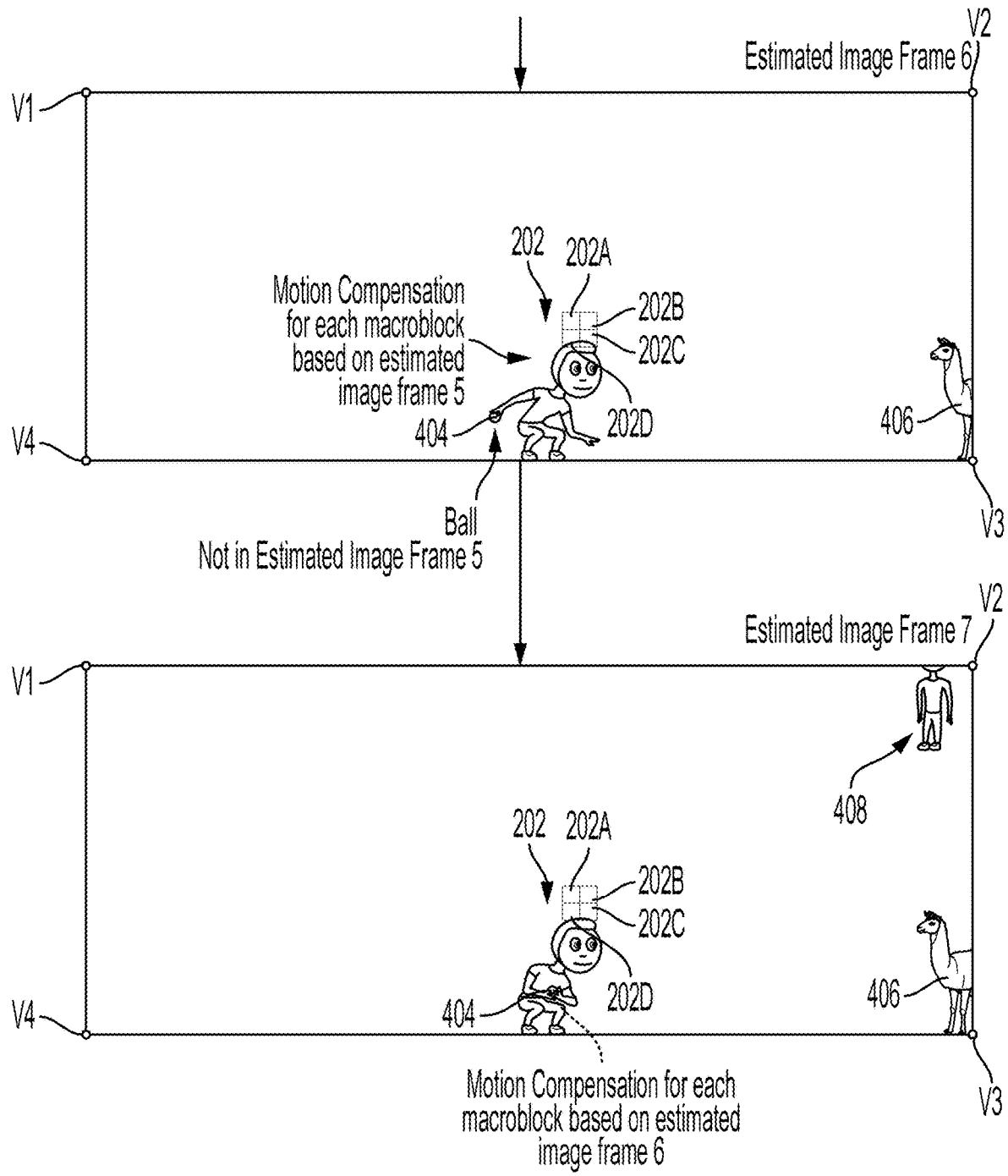
FIG. 4 is a diagram of an embodiment of the E-frames 6 and 7 of FIG. 3.

FIG. 4 is a diagram of an embodiment of the E-frame 6 of FIG. 3 and an embodiment of the E-frame 7 of FIG. 3. The E-frame 6 is generated by the client device from information stored in the E-frame 5 of FIG. 3. The E-frame 6 includes the virtual object 202, a virtual ball 404, and a virtual lama 406. The virtual ball 404 and the virtual lama 406 are not in the E-frame 5. The virtual ball 404 and the virtual lama 406 are generated when the processor of the client device applies the machine learning.

In addition, the motion compensation is applied to the macroblocks 202A-202D by the processor of the client device to bend the virtual object 202 compared to that in the E-frame 5. For example, there is no portion of the head of the virtual object 202 in the macroblocks 202A and 202B. Also, there a lesser portion of the head of the virtual object 202 in the macroblock 202C compared to that illustrated in the macroblock 202C of the E-frame 5 (FIG. 2B) and there a lesser portion of the head of the virtual object 202 in the macroblock 202D compared to that illustrated in the macroblock 202D of the E-frame 5.

The E-frame 7 is generated by the client device from information stored in the E-frame 6. The E-frame 7 includes the virtual object 202, the virtual ball 404, the virtual lama 406, and another virtual object 408. The virtual object 408 is not in the E-frame 6. The virtual object 408 are generated when the client device applies the machine learning.

In addition, the motion compensation is applied to the macroblocks 202A-202D by the client device to bend the virtual object 202 compared to that in the E-frame 6. For example, there is no portion of the head of the virtual object 202 in the macroblocks 202A and 202B. Also, there a slightly lesser portion of the head of the virtual object 202 in the macroblock 202C compared to that illustrated in the macroblock 202C of the E-frame 6 (FIG. 2B) and there a slightly lesser portion of the head of the virtual object 202 in the macroblock 202D compared to that illustrated in the macroblock 202D of the E-frame 6.

In an embodiment, instead of the virtual ball 404, the virtual object 202 is carrying another virtual object, such as a weapon or a stick or toy plane.

Figure 5:
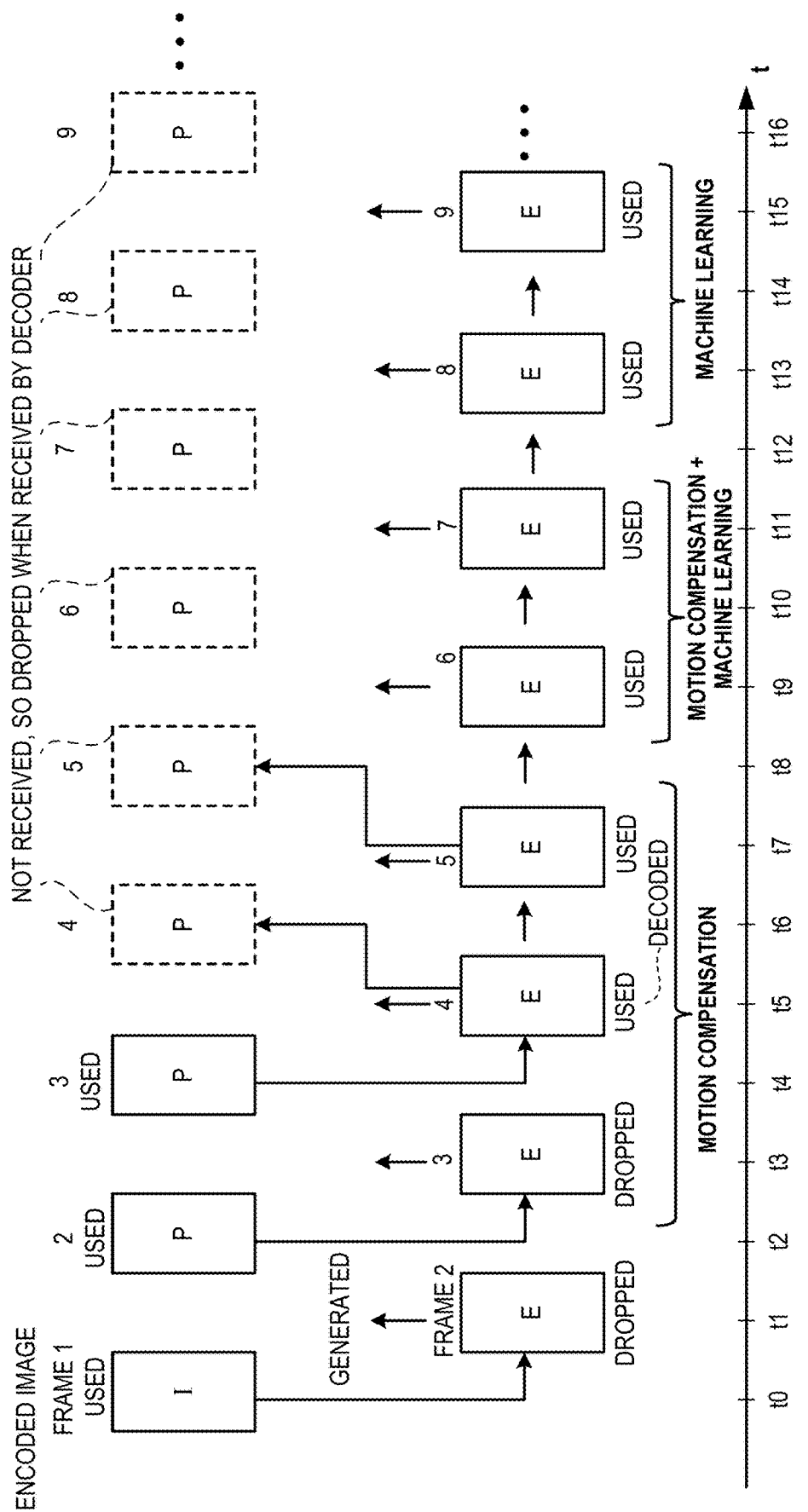
FIG. 5 is a diagram of an embodiment of a system to illustrate generation of E-frames 8 and 9 based on the machine learning.

FIG. 5 is a diagram of an embodiment of a system 500 to illustrate generation of the E-frames 8 and 9 based on the machine learning. The system 500 is the same in structure and function as the system 300 except in the system 500 the P-frames 8 and 9 are not received, and the machine learning is used to generate the E-frames 8 and 9.

The E-frames 2-7 are generated in the same manner as described above with reference to FIG. 3. The client device generates the E-frame 8 from the E-frame 7. The client device applies the machine learning to the information within the E-frame 7 to generate the E-frame 6. To illustrate, the client device applies the machine learning to determine that the game character assumes a straight position compared to a bent position in the E-frame 7 to generate the E-frame 8. The processor of the client device stores the E-frame 8 within the memory device of the client device.

After generating the E-frame 8, the client device determines whether the P-frame 8 is received at the client device. Upon determining that the P-frame 8 is not received, the client device does not drop the E-frame 8. For example, the processor of the client device does not delete the E-frame 8 from the memory device of the client device in response to determining that the P-frame 8 is not received. Rather, the display device of the client device displays the E-frame 8 to achieve the pre-determined frame rate of display of image frames on the display device of the client device.

The E-frame 8 is an approximation of changes likely to occur in the P-frame 8 that is not received at the client device. For example, the E-frame 8 has the same or similar information as that of the P-frame 8. To illustrate, both the E-frame 8 and the P-frame 8 has one or more virtual objects that are not present in the P-frame 6.

It should be noted that if the client device receives the P-frame 8 once the E-frame 8 is displayed, the client device drops the P-frame 8. For example, the processor of the client device deletes or removes the P-frame 8 from the memory device of the client device and the display device of the client device does not display the P-frame 8. As another example, the decoder of the client device does not decode the P-frame 8 and the processor of the client device deletes the P-frame 8. As yet another example, the decoder of the client device deletes the P-frame 8.

The client device generates the E-frame 9 from the E-frame 8. The client device applies the machine learning to the information within the E-frame 8 to generate the E-frame 9. For example, the client device applies the machine learning to determine that once the game character assumes the straight position, the game character tosses the virtual ball in the virtual air instead of throwing the virtual ball to the virtual lama 406 (FIG. 4) to generate the E-frame 9. The processor of the client device stores the E-frame 9 within the memory device of the client device.

After generating the E-frame 9, the client device determines whether the P-frame 9 is received at the client device. Upon determining that the P-frame 9 is not received, the client device does not drop the E-frame 9. For example, the processor of the client device does not delete the E-frame 9 from the memory device of the client device in response to determining that the P-frame 9 is not received. Rather, the display device of the client device displays the E-frame 9 to achieve the pre-determined frame rate of display of image frames on the display device of the client device.

The E-frame 9 is an approximation of changes likely to occur in the P-frame 9 that is not received at the client device. For example, the E-frame 9 has the same or similar information as that of the P-frame 9. To illustrate, both the E-frame 9 and the P-frame 9 has one or more virtual objects that are not present in the P-frame 8.

It should be noted that if the client device receives the P-frame 9 once the E-frame 9 is displayed, the client device drops the P-frame 9. For example, the processor of the client device deletes or removes the P-frame 9 from the memory device of the client device and the display device of the client device does not display the P-frame 9. As another example, the decoder of the client device does not decode the P-frame 9 and the processor of the client device deletes the P-frame 9. As yet another example, the decoder of the client device deletes the P-frame 9.

In one embodiment, the client device determines whether a second pre-determined number of frames, such as the four P-frames 4-7, have not been consecutively received from the server system for facilitating the play of the game. For example, the client device determines that the second pre-determined number of frames have not been received consecutively. In response to determining that the second pre-determined number of frames have not been received consecutively, the client device applies the machine learning to generate the E-frames 8 and 9. The second pre-determined number of frames is sometimes referred to herein as a pre-set threshold.

In an embodiment, the client device determines whether a second pre-determined amount of time has passed since a first frame, such the P-frame 4, in a consecutive series of frames, such as the P-frames 4-7, has not been received by the client device from the server system. Also, the P-frames 5-7 have not been received after the P-frame 4 has not been received. Upon determining that the second pre-determined amount of time has passed, the client device applies the machine learning to generate the P-frames 8 and 9.

In one embodiment, it takes less time for the client device to generate the E-frame 7 and display the E-frame 7 than a sum of an amount of time taken for the server system to encode one or more image frames to generate the P-frame 7 and send the P-frame 7 via the computer network to the client device and an amount of time taken by the client device to decode the P-frame 7 and display the P-frame 7. Similarly, it takes a lower amount of time for the client device to generate the E-frame 8 and display the E-frame 8 than a sum of an amount of time taken for the server system to encode one or more image frames to generate the P-frame 8 and send the P-frame 8 via the computer network to the client device and an amount of time taken by the client device to decode the P-frame 8 and display the P-frame 8.

Figure 6:
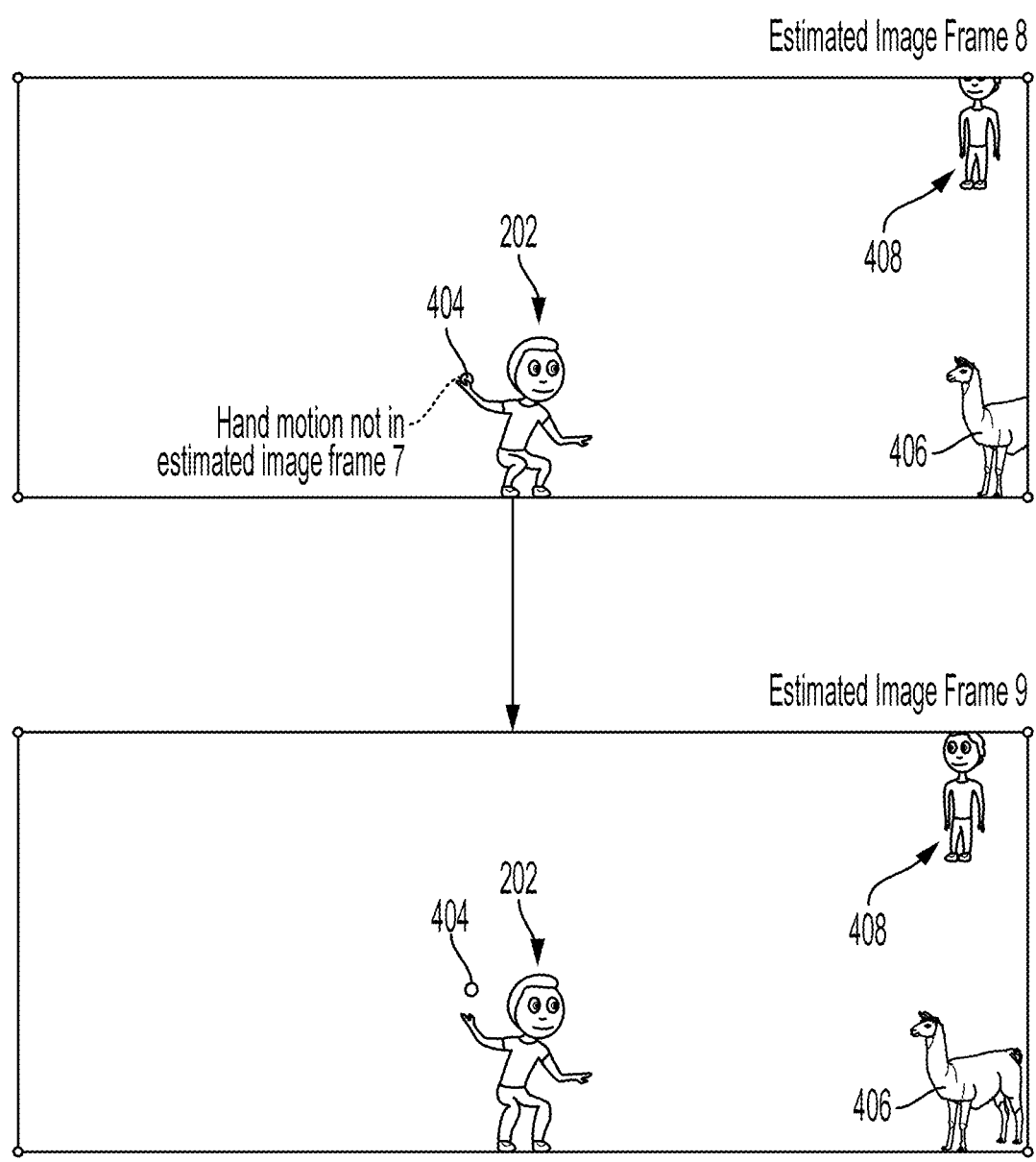
FIG. 6 is a diagram of an embodiment of the E-frame 8 and an embodiment of the E-frame 9 of FIG. 5.

FIG. 6 is a diagram of an embodiment of the E-frame 8 of FIG. 5 and an embodiment of the E-frame 9 of FIG. 5. The E-frame 8 is generated by the client device from information stored in the E-frame 7. The E-frame 8 includes the virtual object 202, a virtual ball 404, the virtual lama 406, and the virtual object 408. The virtual object 202 is in an upright position in the E-frame 8 compared to the bent position in the E-frame 7. The upright position is generated when the client device applies the machine learning to the information stored in the E-frame 7.

In addition, the machine learning is applied to the virtual object 408 by the client device to show a portion of a face of the virtual object 408 in the E-frame 8. It should be noted that the face of the virtual object 408 is not visible in the E-frame 7 (see FIG. 4). Moreover, the machine learning is applied to the virtual lama 406 by the client device to show the virtual lama 406 moving closer to the virtual object 202 compared to a position of the virtual lama 406 in the E-frame 7 (FIG. 4).

The E-frame 9 is generated by the client device from information stored in the E-frame 8. The E-frame 9 includes the virtual object 202, the virtual ball 404, the virtual lama 406, and the virtual object 408. The virtual object 202 performs a motion of tossing the virtual ball 404 in the virtual air in the E-frame 9. The motion of tossing the virtual ball 404 is generated when the client device applies the machine learning to the information stored in the E-frame 8.

In addition, the machine learning is applied to the virtual object 408 by the client device to show the entire face of the virtual object 408 in the E-frame 9. It should be noted that the entire face of the virtual object 408 is not visible in the E-frame 8. Moreover, the machine learning is applied to the virtual lama 406 by the client device to show the virtual lama 406 moving closer to the virtual object 202 compared to a position of the virtual lama 406 in the E-frame 8.

In an embodiment, instead of the virtual ball 404, the virtual object 202 is carrying another virtual object, such as a weapon or a stick or toy plane.

It should be noted that in one embodiment, the operations described herein as being performed by the client device are performed by one or more processors of the client device.

In an embodiment, instead of applying the machine learning to add one or more virtual objects in a consecutively generated E-frame compared to a previously generated E-frame, one or more virtual objects can be removed compared to the previously generated E-frame. For example, one or more virtual objects are removed from the E-frame 6 to generate the E-frame 7 and one or more virtual objects are removed from the E-frame 8 to generate the E-frame 9.

Figure 7:
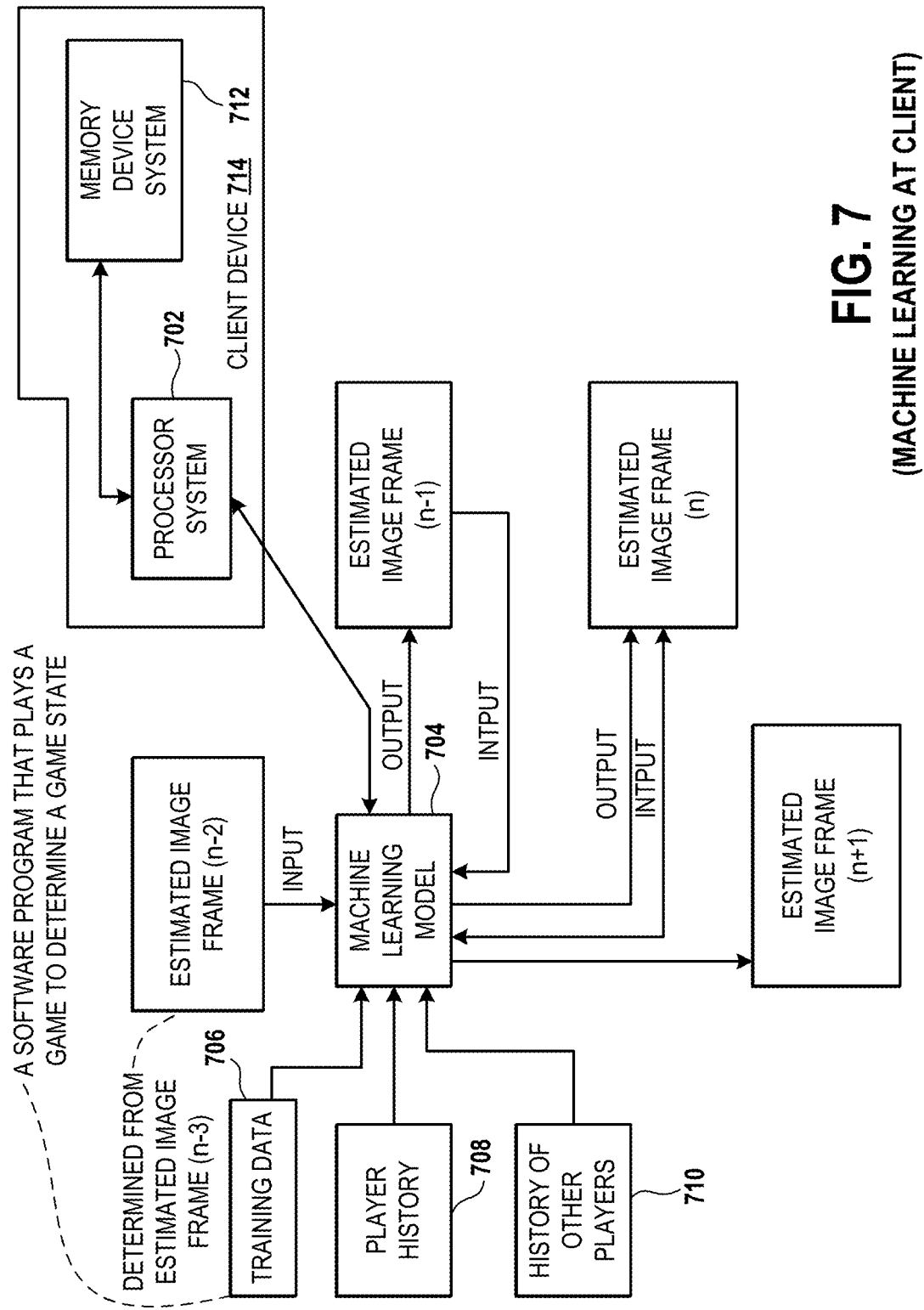
FIG. 7 is a diagram of an embodiment of a system to illustrate the machine learning at a client device.

FIG. 7 is a diagram of an embodiment of a system 700 to illustrate the machine learning at a client device 714. The system 700 includes the client device 714, an E-frame (n−3), an E-frame (n−2), an E-frame (n−1), an E-frame n, an E-frame (n+1), a machine learning model 704, training data 706, player history 708, and history of other players 710, where n is an integer. The client device 714 includes a processor system 702 and a memory device system 712.

The processor system 702 includes one or more processors that are coupled to each other. Similarly, the memory device system 712 includes one or more memory devices that are coupled to each other. The memory device system 712 is coupled to the processor system 702. The processor system 702 executes the machine learning model 704.

The training data 706, the player history 708, and the history of other players 710 are stored in the memory device system 712. As an example, the training data 706, the player history 708, and the history of other players 710 are received via the computer network from the server system and stored in the memory device system 712. In this example, the training data 706, the player history 708, and the history of other players 710 is generated and recorded within one or more memory devices of the server system by one or more servers of the server system.

An example of the training data 706 includes data for training the machine learning model 704, such as an AI. The training data 706 is generated when the AI plays the game to traverse through different stages of the game to learn the game. For example, the AI learns that by tossing the virtual ball 404 (FIG. 6) in the virtual air, a greater number of virtual points can be accumulated during the play of the game compared to throwing the virtual ball 404 (FIG. 4) to the virtual lama 406 (FIG. 4). As another example, the AI learns that during a stage of the game, the virtual user 408 (FIG. 4) and the virtual lama 406 (FIG. 4) walk into a virtual scene, and the virtual object 202 (FIG. 4) holds the virtual ball 404 (FIG. 4).

An example of the player history 708 includes data regarding how a player controls a virtual object in the game or how the player reacts to a stage of the game or whether the player is competitive and controls the virtual object to achieve a pre-determined goal during the game or a combination thereof. For example, the player history 708 is generated for all actions and moves that are performed by the player during the play of the game. To illustrate, the player history 708 includes data indicating that the player is more competitive than a threshold level and tries to achieve the pre-determined goal a majority of times for which the game is played by the player. The game is accessed by the player at the client device via a user account that is assigned to the player by the server system. Once the game is accessed, the server system generates the I-frame 1 and the P-frames 2-9 (FIG. 1) to facilitate the play of the game, and sends the I-frame 1 and one or more of the P-frames 2-9 via the computer network to the client device.

An example of the history of other players 710 includes data regarding how a pre-determined number of, such as a majority of, other players control the virtual object in the game or how the pre-determined number of other players react to the stage of the game or whether the pre-determined number of other players achieve a pre-determined goal during the game or a combination thereof. For example, the history of other players 710 is generated for all actions and moves that are performed by the pre-determined number of other players during the play of the game. To illustrate, the history of other players 710 includes data indicating that the pre-determined number of other players are more competitive or less competitive than the threshold level and each of the pre-determined number of the other players tries to achieve the pre-determined goal a majority of times for which the game is played by each of the pre-determined number of the other players. The game is accessed by the other players at other client devices via corresponding user accounts that are assigned to the pre-determined number of the other players by the server system. Once the game is accessed, the server system generates frames, such as the I-frame 1 and one or more of the P-frames 2-9 (FIG. 1), to facilitate the play of the game, and sends the I-frame 1 and the P-frames 2-9 via the computer network to the other client devices.

It should be noted that the training data 706, the player history 708 and the history of other players 710 are for the same game. For example, the training data 706, the player history 708 and the history of other players 710 are gathered for Fortnite™ video game or NBA 2K20™ video game.

An example of the E-frame (n−3) is the E-frame 5, an example of the E-frame (n−2) is the E-frame 6, an example of the E-frame (n−1) is the E-frame 7, an example of the E-frame n is the E-frame 8, and an example of the E-frame (n+1) is the E-frame 9.

An example of the machine learning model 704 is an application of AI that dynamically changes based on one or more of the training data 706, the player history 708, and the history of other players 710.

The processor system 702 generates the machine learning model 704 from the training data 706, or the player history 708, or the history of other players 710, or a combination thereof. For example, the processor system 702 determines that it is more likely that the virtual object 202 (FIG. 4) will toss the virtual ball 404 (FIG. 6) in the virtual air during a stage of the game than throwing the virtual ball 404 at the virtual lama 406 (FIG. 4). The processor 702 determines so based on an analysis that a majority of the other players toss the virtual ball 404 in the virtual air and do not throw the virtual ball 404 at the virtual lama 406 or that a majority of times for which the player logs into the server system to access and play the game, the player tosses the virtual ball 404 in the virtual air instead of throwing the virtual ball 404 at the virtual lama 406 or that a greater number of virtual points can be accumulated in the game by tossing the virtual ball 404 in the virtual air than throwing the virtual ball 404 at the virtual lama 406 or a combination thereof.

The processor system 702 applies the machine learning model 704 to use information in the E-frame (n−3) to generate the E-frame (n−2). As an example, the processor system 702 determines that the E-frame 5 includes data regarding position and orientation of the virtual object 202. The processor system 702 applies the machine learning model 704 to determine that the virtual object 202 will obtain the virtual ball 404, such as take the virtual ball 404 out of his/her pocket, to generate the E-frame 6. Also, the processor system 702 applies the machine learning model 704 to determine that the virtual lama 406 will appear in front of the virtual object 202 so that the virtual object 202 can throw the virtual ball 404 towards the virtual lama 406 to generate the E-frame 6.

Moreover, the processor system 702 applies the machine learning model 704 to use information in the E-frame (n−2) to generate the E-frame (n−1). As an example, the processor system 702 determines that the E-frame 6 includes data regarding position and orientation of the virtual object 202, data regarding position and orientation of the virtual ball 404, and data regarding position and orientation of the virtual lama 406. The processor system 702 applies the machine learning model 704 to determine that the virtual user 408 will approach the virtual object 202 to generate the E-frame 7.

The processor system 702 further applies the machine learning model 704 to use information in the E-frame (n−1) to generate the E-frame n. For example, the processor system 702 determines that the E-frame 7 includes data regarding position and orientation of the virtual object 202 and data regarding position and orientation of the virtual ball 404. In addition, the processor system 702 determines that the E-frame 7 includes data regarding position and orientation of the virtual user 408 and data regarding position and orientation of the virtual lama 406. To generate the E-frame 8, the processor system 702 applies the machine learning model 704 to the information within the E-frame 7 to determine that the virtual object 202 instead of bending more to throw the virtual ball 404 at the virtual lama 406 will stand up straight to toss the virtual ball 404 in the virtual air, to determine the virtual lama 406 will have a position that is closer to the virtual object 202 compared to the position of the virtual lama 406 in the E-frame 7, and to determine that the virtual user 408 will have a position that is closer to the virtual object 202 compared to the position of the virtual user 408 in the E-frame 7.

The processor system 702 also applies the machine learning model 704 to use information in the E-frame n to generate the E-frame (n+1). For example, the processor system 702 determines that the E-frame 8 includes data regarding position and orientation of the virtual object 202 and data regarding position and orientation of the virtual ball 404. In addition, the processor system 702 determines that the E-frame 7 includes data regarding position and orientation the virtual user 408 and data regarding position and orientation the virtual lama 406. To generate the E-frame 9, the processor system 702 applies the machine learning model 704 to the information stored within the E-frame 8 to determine that the virtual object 202 tosses the virtual ball 404 in the virtual air, to determine the virtual lama 406 will have a position that is closer to the virtual object 202 compared to the position of the virtual lama 406 in the E-frame 8, and to determine that the virtual user 408 will have a position that is closer to the virtual object 202 compared to the position of the virtual user 408 in the E-frame 8.

Figure 8:
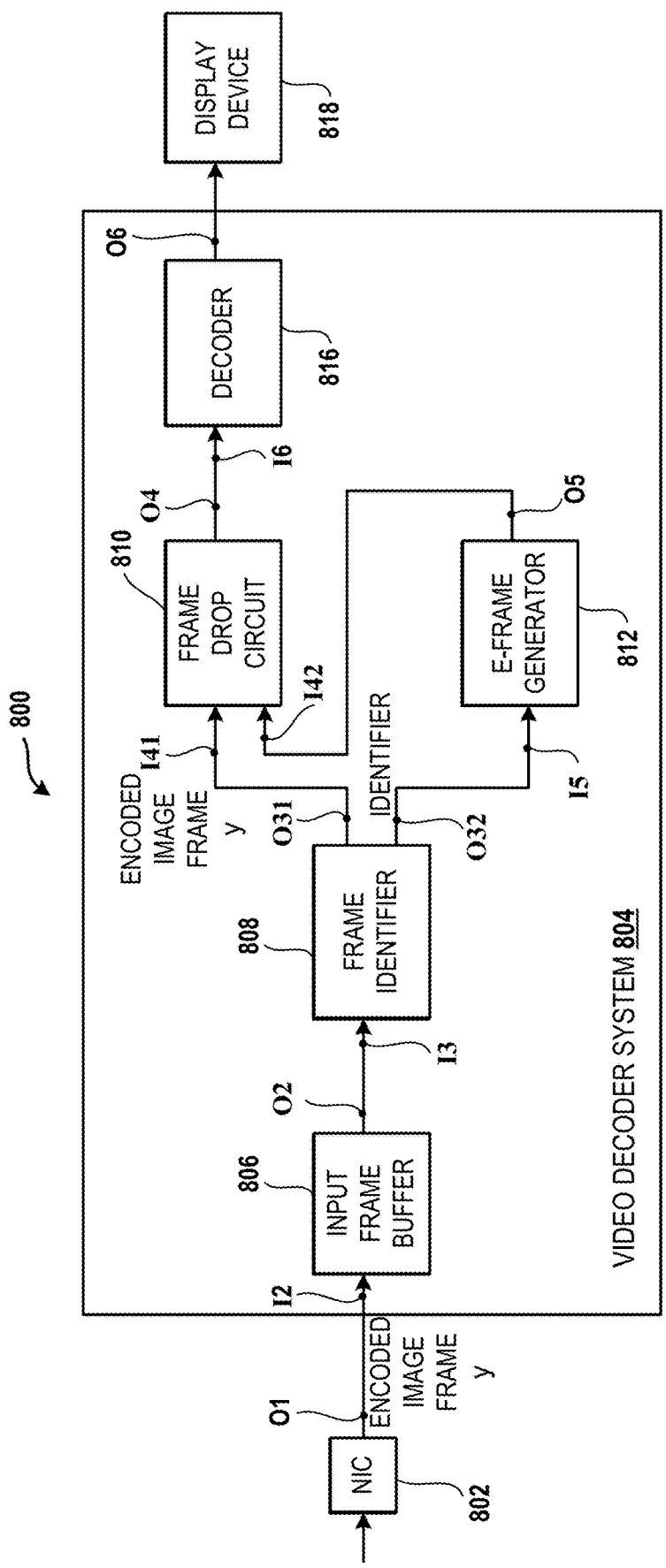
FIG. 8 is a diagram of an embodiment of a client device for illustrating a method for dropping an E-frame.

FIG. 8 is a diagram of an embodiment of a client device 800 for illustrating a method for dropping an E-frame. The client device 800 includes a network interface controller (NIC) 802, such as a network interface card or a network adapter or a LAN adapter, a video decoder system 804, and a display device 818. The NIC 802 is coupled to the video decoder system 802, which is coupled to the display device 818. Examples of the display device 818 include a liquid crystal display (LCD) device, a light emitting diode (LED) display device, and a plasma display device.

The video decoder system 802 includes an input frame buffer 806, a frame identifier 808, a frame drop circuit 810, an E-frame generator 812, and a decoder 816. An example of the input frame buffer 806 is a portion of a random-access memory (RAM). Another example of the input frame buffer 806 is a portion of a memory device of the client device 800.

An example of the frame identifier 808 is a processor or a field programmable gate array (FPGA) or a programmable logic device (PLD) or a controller or a microprocessor or a microcontroller or a central processing unit (CPU). A controller, as used herein, includes a processor and a memory device, and the controller is coupled to the memory device. An example of the frame drop circuit 810 is a processor or a FPGA or a PLD or a controller or a microprocessor or a microcontroller or a CPU. Also, an example of the E-frame generator 812 is a processor or a FPGA or a PLD or a controller or a microprocessor or a microcontroller or a CPU. Also, an example of the frame drop circuit 812 is a processor or an FPGA or a PLD or a controller or a microprocessor or a microcontroller or a CPU.

An example of the decoder 816 is a circuit that decodes, such as decompresses, I-frames, E-frames, P-frames, or B-frames, or a combination thereof, to output display frames or image frames that are displayed on the display device 818. As an example, the P-frame 2 or the E-frame 2 is decompressed using the information in the I-frame 1 (FIG. 1) to display an image on the display device 806. As another example, the P-frame 3 or the E-frame 3 is decompressed using the information in the P-frame 2 and the I-frame 1 to generate an image frame or an image that includes the virtual objects 204, 206, 208, and the virtual object 202 as represented in the E-frame 3 (FIG. 2A). As another example, the decoder 816 includes a variable length decoder circuit, and inverse quantization circuit, and an inverse discrete cosine transform circuit. The inverse quantization circuit is coupled between the variable length decoder circuit and to the inverse discrete cosine transform circuit. An input of the inverse quantization circuit is coupled to an output of the variable length decoder circuit and an output of the inverse quantization circuit is coupled to an input of the inverse discrete cosine transform circuit. As another example, the decoder 816 is a processor or a FPGA or a PLD or a controller or a microprocessor or a microcontroller or a CPU. An example of a decoding protocol applied by the decoder 808 includes the AVC protocol.

An input I2 of the input frame buffer 806 is coupled to an output O1 of the NIC 802. Also, an output O2 of the input frame buffer 806 is coupled to an input I3 of the frame identifier 808 and an output O31 of the frame identifier 808 is coupled to an input I41 of the frame drop circuit 810. Also, an output O32 of the frame identifier 808 is coupled to an input I5 of the E-frame generator 812. An output O5 of the E-frame generator 812 is coupled to an input I42 of the frame drop circuit 810 and an output of the frame drop circuit 810 is coupled to an input I6 of the decoder 816. An output O6 of the decoder 816 is coupled to the display device 818.

The NIC 802 receives a stream, such as packets, of encoded image frames including an encoded image frame y via the computer network from the server system, where y is an integer greater than zero. Examples of the encoded image frames of the stream include the I-frames, P-frames, and B-frames. To illustrate, the encoded image frames of the stream include the I-frame 1 and the P-frames 2 through 9 (FIG. 1). The encoded image frame y is any one of the I-frame 1 and the P-frames 2 through 9. Each of the encoded image frames of the stream includes an identifier of the encoded image frame. For example, the I-frame 1 has an identifier I-frame 1, the P-frame 2 has an identifier P-frame 2, and the P-frame 3 has an identifier P-frame 3.

The identifier of each encoded image frame identifies a type of the encoded image frame and a sequence in which each encoded image frame is generated by the server system. For example, the identifier P-frame 2 of the encoded image frame y identifies that the encoded image frame y is a P-frame and is generated after the I-frame 1 is generated but before the P-frame 3 is generated. As another example, the identifier P-frame 3 of the encoded image frame y identifies that the encoded image frame y is a P-frame and is generated after the P-frame 2 is generated but before the P-frame 4 is generated.

The NIC 802 applies a communication protocol, such as Transmission Control Protocol over Internet Protocol (TCP/IP), to the stream to parse the stream and extract the encoded image frames and the identifiers of the encoded image frames from the stream. The NIC 802 provides the encoded image frames and the identifiers of the encoded image frames to the input frame buffer 806 via the output O1 of the NIC 802 and the input I2 of the input frame buffer 806.

The input frame buffer 806 stores the encoded image frames and the identifiers of the encoded image frames. The frame identifier 808 accesses the encoded image frames and the identifiers of the encoded image frames from the input frame buffer 806 via the input I3 of the frame identifier 808 and the output O2 of the input frame buffer 806. Also, the frame identifier 808 identifies each of the encoded image frames from the identifiers of the encoded image frames. For example, the frame identifier 808 identifies that the P-frame 2 is generated after the I-frame 1 is generated but before the P-frame 3 is generated, that the P-frame 2 is a P-frame, that the P-frame 4 is generated after the P-frame 3 is generated but before the P-frame 4 is generated, and that the P-frame 4 is a P-frame.

In case an encoded image frame is not received by the frame identifier 808 from the input frame buffer 806, the frame identifier 808 determines that the encoded image frame is missing and identifies the missing encoded image frame. For example, the frame identifier 808 determines that the P-frame 4 (FIG. 1) is not received within the stream when the P-frame 4 is not received from the input frame buffer 806. The frame identifier 808 identifies that the P-frame 4 is missing to be received after the P-frame 3. As another example, the frame identifier 808 counts a sequence of the identifiers received from the input frame buffer 806 and determines that an identifier is missing within the sequence to determine that the encoded image frame having the missing identifier is missing. For example, the frame identifier 808 determines that the P-frame 4 is missing upon determining that the P-frame 4 is not received within a pre-determined time period after the P-frame 3 is received. The pre-determined time period is stored within a memory device of the frame identifier 808.

The frame identifier 808 generates a received determination signal indicating that an encoded frame is received from the input frame buffer 806 and generates a unreceived determination signal indicating that an encoded frame is not received from the input frame buffer 806. For example, the frame identifier 808 generates the unreceived determination signal indicating that the P-frame 4 is not received and generates the received determination signal indicating that the P-frame 2 is received. The received determination signal includes the identifier of the encoded image frame y that is received and includes the identifier of the encoded image frame that is not received. Also, the received determination signal includes the information stored within encoded image frame y that is received.

The frame identifier 808 sends the received determination signal of the encoded image frame y via the output O32 and the input I5 to the E-frame generator 812. For example, the frame identifier 808 sends the identifier P-frame 2 and the P-frame 2 that is received at the client device, or the identifier P-frame 3 and the P-frame 3 that is received at the client device, or the identifier I-frame 1 and the I-frame 1 that is received at the client device to the E-frame generator 812.

In case an encoded image frame is not received by the frame identifier 808 from the input frame buffer 806, the frame identifier 808 sends the unreceived determination signal via the output O32 and the input I5 to the E-frame generator 812. For example, the frame identifier 808 sends the identifier P-frame 4, or the identifier P-frame 5, or the identifier P-frame 6, or the identifier P-frame 7, or the identifier P-frame 8, or the identifier P-frame 9 to the E-frame generator 812. The P-frames 4-9 are not sent to the E-frame generator 812 because they are not received (see FIG. 5).

The E-frame generator 812 determines to generate an E-frame based on the received determination signal. For example, the E-frame generator 812 generates the E-frame 2 from the I-frame 1, the E-frame 3 from the P-frame 2, or generates the E-frame 4 from the P-frame 3. To illustrate, the E-frame generator 812 applies the motion compensation to generate the E-frame 2 from the I-frame 1, the E-frame 3 from the P-frame 2, and the E-frame 4 from the P-frame 3. To further illustrate, the E-frame generator 812 parses the information stored within the I-frame 1 to identify a position of the virtual object 202 within the I-frame 1 and applies the motion compensation to the macroblocks 202A-202D to generate the E-frame 2. In the E-frame 2, the virtual object 202A is bent more compared to the virtual object 202A in the I-frame 1. To further illustrate, the E-frame generator 812 parses the information stored within the P-frame 2 to identify a position of the virtual object 202 within the P-frame 2 and applies the motion compensation to the macroblocks 202A-202D to generate the E-frame 3. In the E-frame 3, the virtual object 202A is bent more compared to the virtual object 202A in the P-frame 2. As another illustration, the E-frame generator 812 applies the motion compensation to generate the E-frame 3 from the P-frame 2 and the I-frame 1, or to generate the E-frame 4 from the P-frame 3 and one or more of the P-frame 2 and the I-frame 1.

The E-frame generator 812 also determines to generate an E-frame based on the unreceived determination signal. For example, the E-frame generator 812 generates the E-frame 5 from the E-frame 4, or the E-frame 6 from the E-frame 5, or the E-frame 7 from the E-frame 6, or the E-frame 8 from the E-frame 7, or the E-frame 9 from the E-frame 8. To illustrate, the E-frame generator 812 applies the motion compensation to generate the E-frame 4 from the E-frame 3 and to generate the E-frame 5 from the E-frame 4, applies the motion compensation and the machine learning to generate the E-frame 6 from the E-frame 5 and to generate the E-frame 7 from the E-frame 6, and applies the machine learning to generate the E-frame 8 from the E-frame 7 and to generate the E-frame 9 from the E-frame 8.

The E-frame generator 812 outputs an E-frame at the output O5 and sends the E-frame via the output O5 and the input I42 to the frame drop circuit 810. For example, the E-frame generator 812 sends any of the E-frames 2-9 to the frame drop circuit 810.

Moreover, the frame drop circuit 810 receives the encoded image frame y from the frame identifier 808 via the output O31 and the input I41. For example, the frame drop circuit 810 receives the I-frame 1, the P-frame 2, or the P-frame 3 from the frame identifier 808. The I-frame 1, the P-frame 2, and the P-frame 3 are received at the client device. In case the encoded image frame y is not received, the frame drop circuit 810 receives an identifier of the encoded image frame y. For example, the frame drop circuit 810 receives an identifier of any of the P-frames 4-9 that are not received (FIG. 5) at the client device. The frame drop circuit 810 stores the encoded image frame y that is received from the frame identifier 808 and any E-frame received from the E-frame generator 812 in a memory device of the frame drop circuit 810.

The frame drop circuit 810 determines to drop the E-frame received from the E-frame generator 812 and sends a corresponding encoded image frame y to the decoder 816 upon determining that the corresponding encoded image frame y is received from the frame identifier 808. For example, upon determining that the P-frame 2 is received by the frame drop circuit 810 from the frame identifier 808, the frame drop circuit 810 drops the E-frame 3 that is generated based on the information within the P-frame 2, and sends the P-frame 2 to the decoder 816 via the output O4 and the input I6. As another example, upon determining that the P-frame 3 is received by the frame drop circuit 810 from the frame identifier 808, the frame drop circuit 810 drops the E-frame 4 that is generated based on the information within the P-frame 3, and sends the P-frame 4 to the decoder 816 via the output O4 and the input I6. As used herein, the terms drop, delete, erase, discard, and remove are used herein interchangeably.

On the other hand, the frame drop circuit 810 determines to use or apply the E-frame received from the E-frame generator 812 and sends the E-frame via the output O4 and the input I6 to the decoder 816 upon determining that the corresponding encoded image frame y is not received from the frame identifier 808. For example, upon determining that the P-frame 4 is not received by the frame drop circuit 810 from the frame identifier 808, the frame drop circuit 810 determines to send the E-frame 5 to the decoder 816 via the output O4 and the input I6. The E-frame 5 is generated based on the information within the E-frame 4. As another example, upon determining that the P-frame 5 is not received by the frame drop circuit 810 from the frame identifier 808, the frame drop circuit 810 determines to send the E-frame 6 to the decoder 816 via the output O4 and the input I6. The E-frame 6 is generated based on the information within the E-frame 5. As yet another example, upon determining that the P-frame 6 is not received by the frame drop circuit 810 from the frame identifier 808, the frame drop circuit 810 determines to send the E-frame 7 to the decoder 816 via the output O4 and the input I6. The E-frame 7 is generated based on the information within the E-frame 6. As still another example, upon determining that the P-frame 7 is not received by the frame drop circuit 810 from the frame identifier 808, the frame drop circuit 810 determines to send the E-frame 8 to the decoder 816 via the output O4 and the input I6. The E-frame 8 is generated based on the information within the E-frame 7. As another example, upon determining that the P-frame 8 is not received by the frame drop circuit 810 from the frame identifier 808, the frame drop circuit 810 determines to send the E-frame 9 to the decoder 816 via the output O4 and the input I6. The E-frame 9 is generated based on the information within the E-frame 8.

The decoder 816 receives the corresponding encoded image frame y or an E-frame from the frame drop circuit 810 via the output O4 and the input I6 and applies the decoding protocol to decode the corresponding encoded image frame y or the E-frame. As an example, upon receiving the P-frame 2, the decoder 816 decompresses the P-frame 2 to output one or more decoded frames. To illustrate, the decoder 816 applies the information within the I-frame 1 and the P-frame 2 to generate the one or more decoded frames. As another example, upon receiving the P-frame 3, the decoder 816 decompresses the P-frame 3 to output one or more decoded frames. To illustrate, the decoder 816 applies the information within the P-frame 3 and one or more of the P-frame 2 and the I-frame 1 to generate the one or more decoded frames.

As yet another example, upon receiving the E-frame 4, the decoder 816 decompresses the E-frame 4 to output one or more decoded frames. To illustrate, the decoder 816 applies the information within the E-frame 4, and the information within one or more of the I-frame 1 and the P-frame 2 to generate the one or more decoded frames. As still another example, upon receiving the E-frame 5, the decoder 816 decompresses the E-frame 5 to output one or more decoded frames. To illustrate, the decoder 816 applies the information within the E-frame 5, and the information within one or more of the I-frame 1 and the P-frames 2 and 3 to generate the one or more decoded frames.

As yet another example, upon receiving the E-frame 6, the decoder 816 decompresses the E-frame 6 to output one or more decoded frames. To illustrate, the decoder 816 applies the information within the E-frame 6, and the information within one or more of the I-frame 1 and the P-frames 2 and 3 to generate the one or more decoded frames. As still another example, upon receiving the E-frame 7, the decoder 816 decompresses the E-frame 7 to output one or more decoded frames. To illustrate, the decoder 816 applies the information within the E-frame 7, and the information within one or more of the I-frame 1 and the P-frames 2 and 3 to generate the one or more decoded frames.

As yet another example, upon receiving the E-frame 8, the decoder 816 decompresses the E-frame 8 to output one or more decoded frames. To illustrate, the decoder 816 applies the information within the E-frame 8, and the information within one or more of the I-frame 1 and the P-frames 2 and 3 to generate the one or more decoded frames. As still another example, upon receiving the E-frame 9, the decoder 816 decompresses the E-frame 9 to output one or more decoded frames. To illustrate, the decoder 816 applies the information within the E-frame 9, and the information within one or more of the I-frame 1 and the P-frames 2 and 3 to generate the one or more decoded frames.

The one or more decoded frames are sent from the decoder 816 to the display device 818 for displaying one or more images, such as image frames, of the game. For example, each image frame represents a virtual scene of the game. For example, the one or more decoded frames are sent from the decoder 816 via the output O6 to the display device 818.

In case the corresponding encoded image frame y is received from the frame identifier 808 by the frame drop circuit 810 after a corresponding E-frame is received from the E-frame generator 812, the frame drop circuit 810 drops the corresponding encoded y frame to maintain the pre-determined rate of display of image frames on the display device 818. For example, when the frame drop circuit 810 receives the P-frame 4 from the frame identifier circuit 808 after receiving the E-frame 4 from the E-frame generator 812, the frame drop circuit 810 drops the P-frame 4. To illustrate, the frame drop circuit 810 drops the P-frame 4 by not storing the P-frame 4 in the memory device of the frame drop circuit 810.

It should be noted that the decoder 816 decodes the corresponding encoded image frame y or an E-frame to achieve the pre-determined frame rate of display by the display device 818. For example, the I-frame 1, the P-frames 2 and 3, and the E-frames 4-9 illustrated in FIG. 5 are decoded by the decoder 816 at decode intervals to achieve the pre-determined frame rate of display by the display device 818. A decode interval is a time period between decoding of two consecutive frames. For example, the decode interval is a time period between decoding of the P-frame 2 and the P-frame 3 or between decoding of the P-frame 3 and the E-frame 4 or between decoding of the E-frame 4 and the E-frame 5.

In one embodiment, instead of the frame identifier 808 accessing the encoded image frames and the identifiers of the encoded image frames from the input frame buffer 806, the encoded image frames and the identifiers are sent from the input frame buffer 806 via the output O2 and the input I3 to the frame identifier 808 as the input frame buffer 806 becomes full. As an example, the input frame buffer 806 is a first-in-first-out frame buffer.

In an embodiment, the input frame buffer 806 is not included within the video decoder system 802. For example, the NIC 802 sends the encoded image frames and the identifiers of the encoded image frames via the output O1 and the input I3 to the frame identifier 808.

In one embodiment, the E-frame generator 812 and the frame drop circuit 810 are parts of the decoder 816. For example, the E-frame generator 812 can be a plug-in that is installed within a computer program that implements the decoding protocol. The computer program is executed by the decoder 816.

Figure 9:
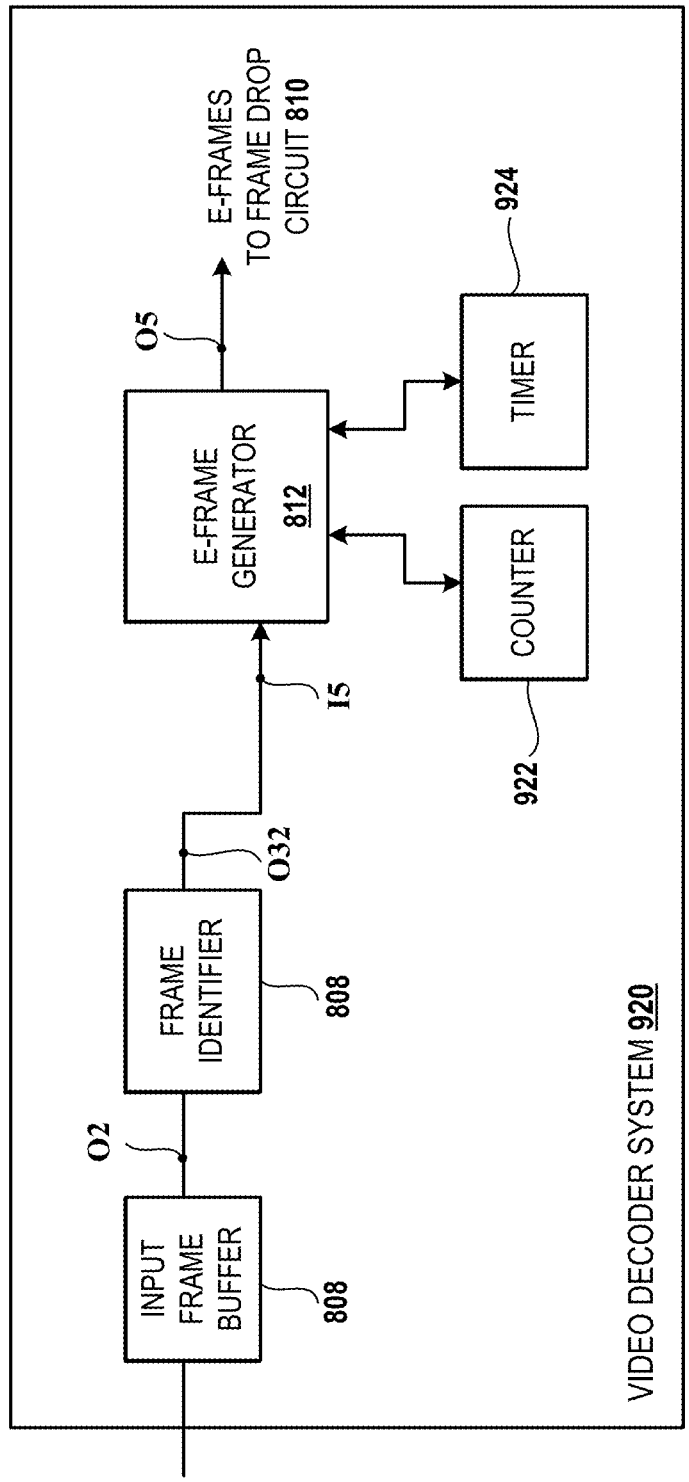
FIG. 9 is a diagram of an embodiment of a video decoder system to illustrate use of a combination of the motion compensation and machine learning and use of the machine learning at the client device.

FIG. 9 is a diagram of an embodiment of a video decoder system 920 to illustrate use of a combination of the motion compensation and machine learning and use of the machine learning. The video decoder system 920 is the same in structure and function as the video decoder system 804 (FIG. 8) except that the video decoder system 920 includes a counter 922 and a timer 924.

An example of the counter 922 is a processor or a FPGA or a PLD or a controller or a microprocessor or a microcontroller or a CPU. An example of the timer 924 is a clock, such as a stopwatch, that is used for measuring time intervals. The counter 922 is coupled to the E-frame generator 812 and the timer 924 is coupled to the E-frame generator 812.

The E-frame generator 812 receives an identifier of the P-frame 4 (FIG. 1) that is not received by the frame identifier 808, and initiates the counter 922 and the timer 924. For example, each time a frame identifier of an encoded image frame that is not received by the E-frame generator 812 from the frame identifier 808, is received by the E-frame generator 812 from the frame identifier 808, the E-frame generator 812 sends an increment count signal to the counter 922 and upon receiving the increment count signal, the counter 922 increment its count by one to count a number of identifiers that are received from the frame identifier 808 by the E-frame generator 812. The identifiers are of encoded image frames, such as the P-frames 4-9 (FIG. 5), that are not received by the frame identifier 808 from the input frame buffer 806. To illustrate, upon receiving the identifier P-frame 4 of the P-frame 4 that is not received from the server system by the client device, the E-frame generator 812 sends the increment count signal to the counter 922 and the counter 922 increments its count to one. Upon receiving the identifier P-frame 5 of the P-frame 5 that is not received from the server system by the client device, the E-frame generator 812 sends the increment count signal to the counter 922 and the counter 922 increments its count to two. Upon receiving an encoded image frame after not receiving one or more encoded image frames from the frame identifier 808, the E-frame identifier 808 sends a return-to-zero signal to the counter 922. Upon receiving the return-to-zero signal, the counter 922 changes its count back to zero.

As another example, each time a frame identifier of an encoded image frame that is not received by the E-frame generator 812 from the frame identifier 808, is received by the E-frame generator 812 from the frame identifier 808, the E-frame generator 812 sends an initiate timer signal to the timer 924 and upon receiving the initiate timer signal, the timer 924 starts counting a time from non-reception of the encoded frame by the E-frame generator 812 from the frame identifier 808. To illustrate, upon receiving the identifier P-frame 4 of the P-frame 4 that is not received from the server system by the client device, the E-frame generator 812 sends the initiate timer signal to the timer 924 and the timer 924 starts timing and continues the timing until a stop timer signal is received from the E-frame generator 812. Upon receiving an encoded image frame after not receiving one or more encoded image frames from the frame identifier 808, the E-frame identifier 808 sends the stop timer signal to the timer 924. Upon receiving the stop timer signal, the timer 924 reverts its time back to zero.

The counter 922 sends each count to the E-frame generator 812. Upon receiving the count from the counter 922, the E-frame generator 812 determines whether the first pre-determined number of frames has been received by the frame identifier 808 from the server system via the computer network, the NIC 802, and the input frame buffer 806. For example, the E-frame generator 812 determines that the count received from the counter 922 matches the first pre-determined number of frames to determine that the first pre-determined number of frames is reached. In response to determining that the first pre-determined number of frames has been received, the E-frame generator 812 applies the motion compensation and the machine learning to generate E-frames, such as the E-frames 6 and 7 (FIGS. 3 and 5).

Similarly, upon receiving the count from the counter 922, the E-frame generator 812 determines whether the second pre-determined number of frames has been received by the frame identifier 808 from the server system via the computer network, the NIC 802, and the input frame buffer 806. For example, the E-frame generator 812 determines that the count received from the counter 922 matches the second pre-determined number of frames to determine that the second pre-determined number of frames is reached. In response to determining that the second pre-determined number of frames has been received, the E-frame generator 812 applies the machine learning to generate E-frames, such as the E-frames 8 and 9 (FIG. 5).

Also, the timer 924 sends an amount of time passed since reception of the identifier of an encoded image frame, such as the P-frame 4, that is not received by the frame identifier 808 from the server system via the computer network, the NIC 802, and the input frame buffer 806. Upon receiving the amount of time passed from the timer 924, the E-frame generator 812 determines whether the first pre-determined amount of time is reached since the reception of the identifier of the encoded image frame that is not received. For example, the E-frame generator 812 determines that the amount of time passed received from the timer 924 matches the first pre-determined amount of time to determine that the first pre-determined amount of time is reached. In response to determining that the first pre-determined amount of time is reached, the E-frame generator 812 applies the motion compensation and the machine learning to generate E-frames, such as the E-frames 6 and 7 (FIGS. 3 and 5).

Similarly, upon receiving the amount of time from the timer 924, the E-frame generator 812 determines whether the second pre-determined amount of time is reached since the reception of the identifier of the encoded image frame that is not received. For example, the E-frame generator 812 determines that the amount of time passed received from the timer 924 matches the second pre-determined amount of time to determine that the second pre-determined amount of time is reached. In response to determining that the second pre-determined amount of time is reached, the E-frame generator 812 applies the machine learning to generate E-frames, such as the E-frames 8 and 9 (FIG. 5).

In one embodiment, the counter 922 and the timer 924 are parts of the E-frame generator 812.

In an embodiment, the video decoder system 920 does not include the counter 922 or the timer 924.

In one embodiment, instead of the P-frames, described herein, that are received, bi-directional frames (B-frames) or a combination of B-frames and P-frames are received at the client device. Each B-frame includes data that has changed from a preceding encoded frame received at a client device or have data different from data in the very next encoded frame received at the client device.

Figure 10:
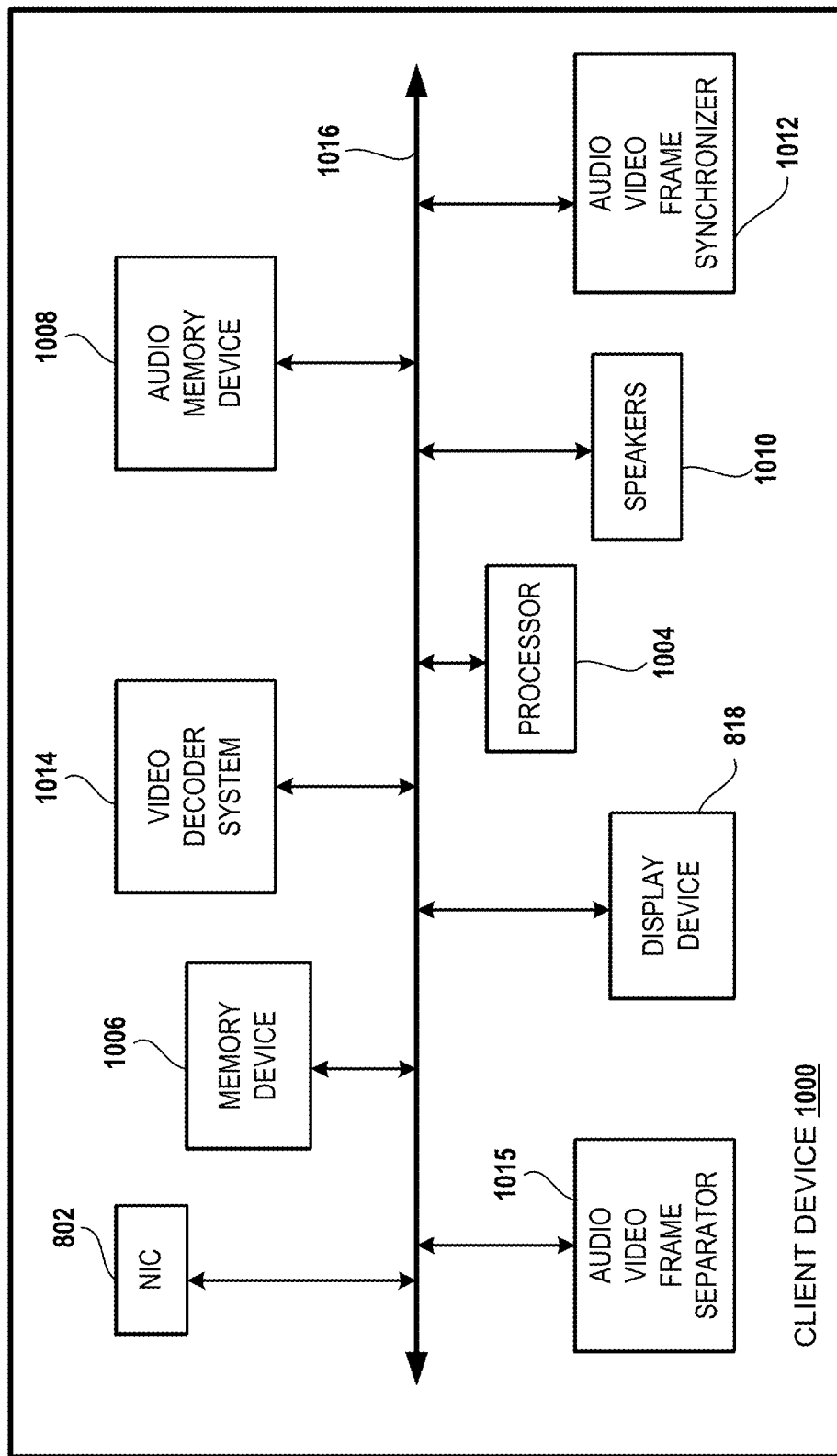
FIG. 10 is a diagram of an embodiment of a client device.

FIG. 10 is a diagram of an embodiment of a client device 1000. The client device 1000 includes multiple components, such as the NIC 802, an audio video frame synchronizer 1014, a memory device 1006, a video decoder system 1014, an audio memory device 1008, an audio video frame separator 1015, the display device 818, a processor 1004, one or more speakers 1010, and an audio video frame synchronizer 1012. Examples of the video decoder system 1014 include the video decoder system 804 (FIG. 8) and 920 (FIG. 9). The components of the client device 1000 are coupled to each other via a bus 1016.

An example of the audio video frame separator 1015 is a processor or a FPGA or a PLD or a controller or a microprocessor or a microcontroller or a CPU. Also, an example of the audio video frame separator 1015 is a processor or a FPGA or a PLD or a controller or a microprocessor or a microcontroller or a CPU. An example of the audio video frame synchronizer 1012 is a processor or a FPGA or a PLD or a controller or a microprocessor or a microcontroller or a CPU.

The NIC 802 applies the communication protocol to a stream that includes multiple encoded image frames, such as the encoded image frame y (FIG. 8A), and multiple audio frames. The communication protocol is applied to parse the stream obtain the encoded image frames and the audio frames, and sends the encoded image frames and the audio frames via the bus 1016 to the audio video frame separator 1015.

The audio video frame separator 1015 separates the encoded image frames from the audio frames. For example, the audio video frame separator 1015 identifies a difference between file extension of the encoded image frames and a file extension of the audio frames to distinguish the encoded image frames from the audio frames.

The audio video frame separator 1015 sends the audio frames via the bus 1016 to the audio memory device 1008 and sends the encoded image frames via the bus 1016 to the video decoder system 1014. Functions of the video decoder system 1014 are described above with reference to FIGS. 8A and 8B. The audio frames are stored in the audio memory device 1008.

The video decoder system 1014 applies the decoding protocol to output decoded image frames based on the encoded image frames and sends the decoded image frames to the audio video frame synchronizer 1012. The audio video frame synchronizer 1012 accesses the audio frames from the audio memory device 1008 and synchronizes the audio frames with the decoded image frames. For example, the audio video frame synchronizer 1012 matches a timing at which each of the decoded image frames is displayed on the display device 818 with a timing at which sound based on a corresponding one of the audio frames is to be output by the one or more speakers 1010.

The audio video frame synchronizer 1012 sends the decoded image frames 1012 via the bus 1016 to the display device 818, which displays the decoded images on a display screen of the display device 818. Also, simultaneous with the display of the decoded images, the one or more speakers 1010 output the sound based on the image frames in a synchronized manner.

The processor 1004 controls one or more of the components of the client device 1000. For example, the processor 1004 executes an operating system that enables communication between the components via the bus 1016.

Figure 11:
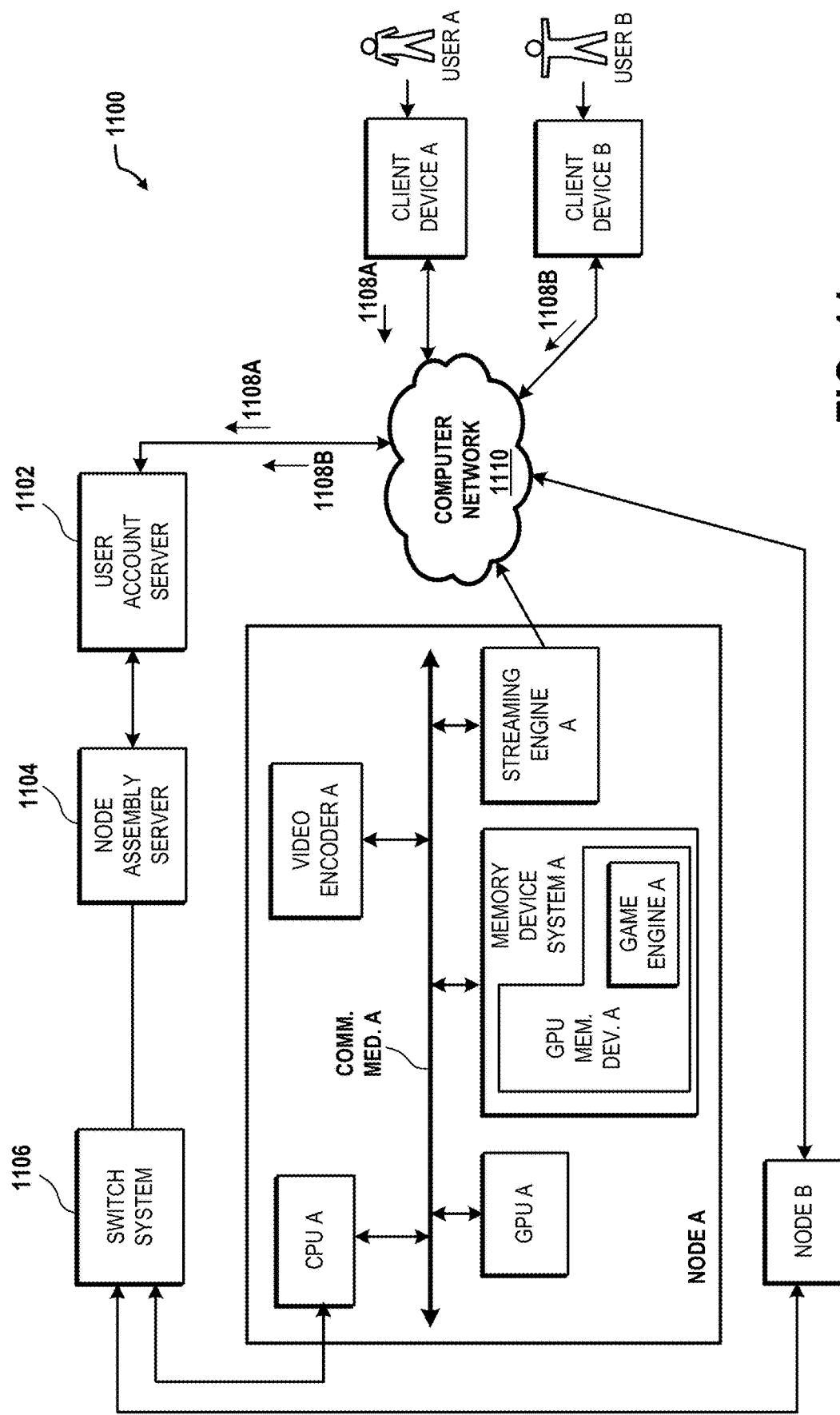
FIG. 11 is a diagram of an embodiment of a system to illustrate use of nodes A and B for distributed gaming.

FIG. 11 is a diagram of an embodiment of a system 1100 to illustrate use of nodes A and B for distributed gaming. The system 1100 includes a user account server 1102, a node assembly server 1104, a switch system 1106, the nodes A and B, a computer network 1110, and client devices A and B. The client device 800 (FIG. 8) is an example of each of the client devices A and B. Examples of the computer network 1110 are provided above.

A node, as used herein, is a hardware server or a game console that executes a game engine A. As an example, a node has a separate housing than a housing of another node. As another example, a node is placed on a different rack of a data center than a rack on which another node is placed within the data center. In one embodiment, a server, as used herein, includes a processor and a memory device. The processor is coupled to the memory device.

Examples of a game engine, as described herein, include a game computer program, a computer program for generating a virtual reality (VR) scene, a computer program for generating an augmented reality (AR) scene, a physics software program for applying the laws of physics for generating the VR scene or the AR scene, or a rendering computer program for applying a rendering operation for generating the VR scene or the AR scene, or a combination of two or more thereof. To illustrate, the laws of physics are applied for collision detection or collision response. Examples of the virtual scene include the VR scene and the AR scene. As an example, the virtual scene includes one or more virtual objects and one or more virtual backgrounds. To illustrate, the virtual scene includes multiple virtual users, multiple virtual trees, multiple virtual weapons held by the virtual users, a virtual sky, and a virtual plane of the game, such as a video game.

A switch system, as used herein, includes one or more switches that facilitate a transfer of data between the node assembly server 1104 and one or more of the nodes A and B. For example, the switch system is a switch fabric. The switch fabric has a large amount of bandwidth among nodes and is dynamically reconfigured often and allows for Quality of Service (QoS). As another example, a switch system includes a multiplexer that selects between the nodes A and B for execution of the game engine A. As another example, the switch system includes one or more transistors that facilitate a transfer of data between the node assembly server 1104 and one or both the nodes A and B. As yet another example, the switch system includes one or more switches, each of which changes its position between an open position and a closed position. The open position of a switch decouples the node assembly server 1104 from a node that is coupled to the switch. The closed position of the switch couples the node assembly server 1104 to a node that is coupled to the switch.

The node A includes components, such as a CPU A, a graphics processing unit (GPU) A, a memory device system A, a video encoder A, and a streaming engine A. An example of the memory device system A includes a system that includes one or more memory devices. An example of the video encoder A is an encoder that applies the encoding protocol. An example of the streaming engine A is a NIC. The components of the node A are coupled to each other via a communication medium A, such as a bus. The memory device system A includes a GPU memory device A, which includes a frame buffer for storing encoded image frames, such as the encoded image frame y. The memory device system A stores the game engine A. The GPU memory device A is coupled to the communication medium A.

The node B has the same or similar components as that of the node A. For example, the node B includes a CPU, a GPU, a memory device system, a video encoder, and a streaming engine, and the components of the node B are coupled to each other via a bus.

Upon receiving login information, such as a username and a password, from the user A via an input device, e.g., the hand-held controller, a camera, etc., of the client device A, the client device A generates a game request 1108A and sends the game request 1108A with the login information via the computer network 1110 to the user account server 702. Similarly, upon receiving login information from the user B via an input device of the client device B, the client device B generates a game request 1108B and sends the game request 1108B with the login information via the computer network 1110 to the user account server 1102.

The user account server 1102 determines based on the login information received with the game request 1108A whether the client device A is authorized to access the game engine A. For example, upon authenticating the login information received with the game request 1108A, the user account server 1102 determines that the client device A is authorized to access the game engine A. Also, the user account server 1102 determines based on the login information received with the game request 1108B whether the client device B is authorized to access the game engine A. Upon determining that the user accounts A and B are authorized to access the game engine A, the user account server 1102 sends a signal to the node assembly server 1104 for enabling execution of the game engine A.

The node assembly server 1104 upon receiving the signal from the user account server 1102 selects, via the switch system 1106, one or both the nodes A and B that will execute the game engine A to initialize the one or both the nodes A and B. For example, the node assembly server 1104 sends a signal to a control input of the switch system 1106 to couple to one of the nodes A and B. Upon receiving the signal at the control input, the switch system 1106 closes a position of one of the switches to connect the node assembly server 1104 to the node A and opens a position of another one of its switches to disconnect the node assembly server 1104 from the node B. As another example, the node assembly server 1104 sends a signal to a control input of the switch system 1106 to couple to the nodes A and B. Upon receiving the signal at the control input, the switch system 1106 closes a position of one of the switches to connect the node assembly server 1104 to the node A and closes a position of another one of the switches to connect the node assembly server 1104 to the node B.

The game engine A is executed to transfer data, such as the encoded image frames, from one or both the nodes A and B via the computer network 1102 to the client devices A and B. The GPU A is a shared resource when the data, such as the encoded image frames, is being transferred from the node A to the client devices A and B. The GPU A is shared between the client devices A and B. One or more user inputs are sent from the client device A to the node A after the game request 1108A is sent from the client device A to the node A.

Upon receiving the encoded image frames via the computer network 1102, the client device A includes the video decoder system 1014 (FIG. 10) that applies the method described above with reference to FIGS. 1-9 and decodes, such as decompresses, the encoded image frames to generate the decoded image frames. The display device 818 (FIG. 10) of the client device A displays the decoded image frames to display the virtual scene of the game on the display screen of the display device 818.

It should be noted that in one embodiment, the system 1100 includes a number of nodes other than that illustrated in FIG. 11. For example, the system 1100 includes 50 nodes, or 25 nodes, or 5 nodes.

Figure 12:
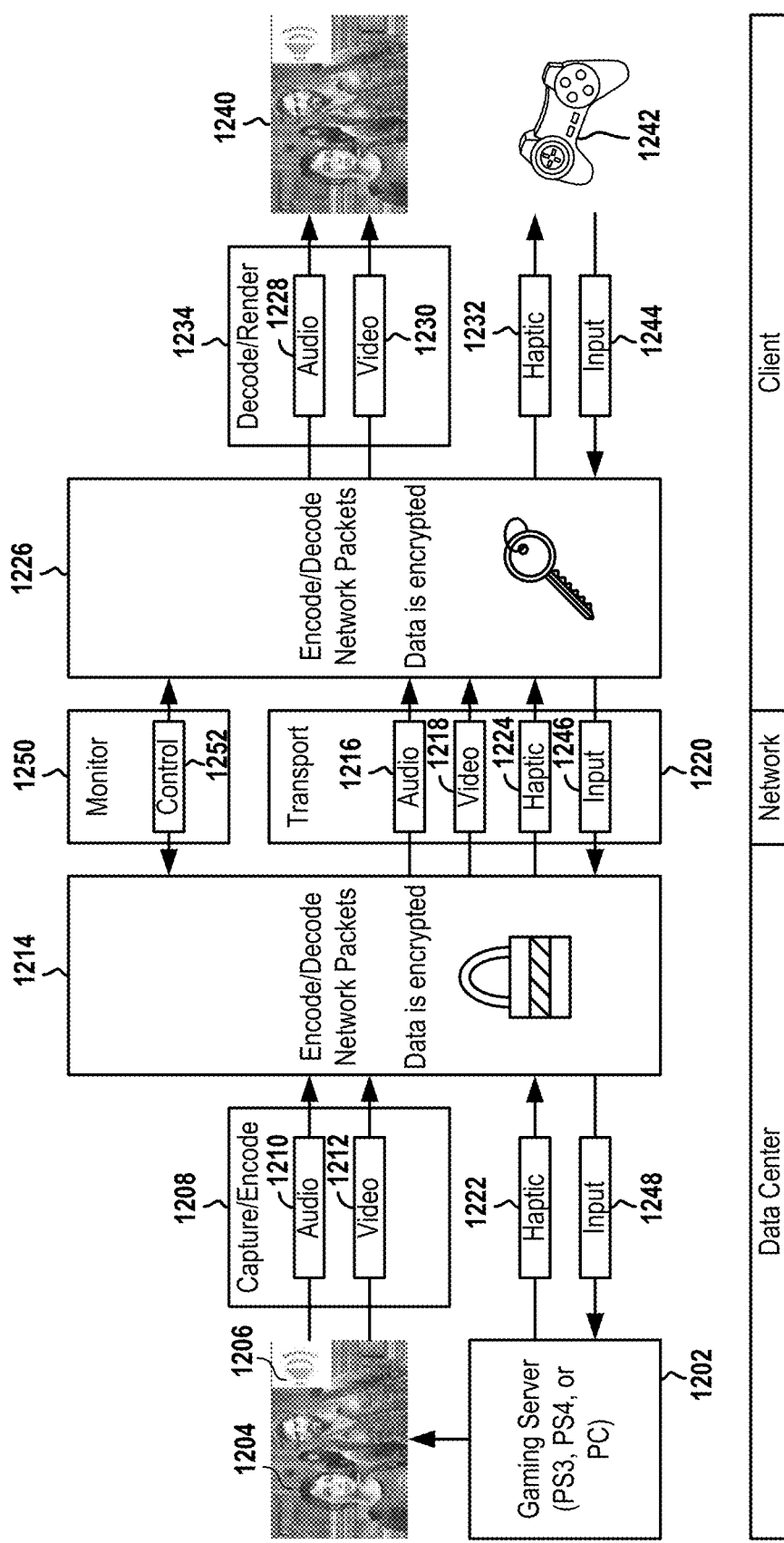
FIG. 12 is an embodiment of a flow diagram conceptually illustrating various operations which are performed for streaming a cloud video game to a client device A or B.

FIG. 12 is an embodiment of a flow diagram conceptually illustrating various operations which are performed for streaming a cloud video game to the client device A or B (FIG. 11). A game server 1202, which is an example of the node A or B (FIG. 11), executes a video game and generates raw (uncompressed) video 1204 and audio 1206. The video 1204 and audio 1206 are captured and encoded for streaming purposes, as indicated at reference 1208 in the illustrated diagram. The encoding provides for compression of the video and audio streams to reduce bandwidth usage and optimize the gaming experience. Examples of encoding formats include H.265/MPEG-H, H.264/MPEG-4, H.263/MPEG-4, H.262/MPEG-2, WMV, VP6/7/8/9, etc.

Encoded audio 1210 and encoded video 1212 are further packetized into network packets, as indicated at reference numeral 1214, for purposes of transmission over a computer network 1220, such as the Internet. In some embodiments, the network packet encoding process also employs a data encryption process, thereby providing enhanced data security. In the illustrated implementation, audio packets 1216 and video packets 1218 are generated for transport over the computer network 1220, which is an example of the computer network 1110 (FIG. 11).

The game server 1202 additionally generates haptic feedback data 1222, which is also packetized into network packets for network transmission. In the illustrated implementation, haptic feedback packets 1224 are generated for transport over the computer network 1220.

The foregoing operations of generating the raw video and audio and the haptic feedback data are performed on the game server 1202 of the data center, and the operations of encoding the video are performed by a video encoder, such as the video encoder A (FIG. 11), and packetizing the encoded audio/video and haptic feedback data for transport are performed by the streaming engine, such as the streaming engine A, of the data center. As indicated, the audio, video, and haptic feedback packets are transported over the computer network 1220. As indicated at reference 1226, the audio packets 1216, the video packets 1218, and the haptic feedback packets 1224, are disintegrated, e.g., parsed, etc., by the client device A or B to extract encoded audio 1228, encoded video 1230, and haptic feedback data 1232 at the client device from the network packets. If data has been encrypted, then the data is also decrypted. The encoded audio 1228 and encoded video 1230 are then decoded by the client device A or B, as indicated at reference 1234, to generate client-side raw audio and video data for rendering on a display device 1240 of the client device. The haptic feedback data 1232 is processed by a processor of the client device, such as the client device A or B, to produce a haptic feedback effect at a controller device 1242 or other interface device, e.g., the HMD, etc., through which haptic effects can be rendered. One example of a haptic effect is a vibration or rumble of the controller device 1242. The controller device 1242 is an example of the hand-held controller that has multiple buttons.

The controller device 1242 is also a part of the client device A or B. For example, the client device A or B includes the controller device 1242 and a game console. As another example, the client device A or B includes the controller device 1242 and an HMD. As yet another example, the client device A or B includes the controller device 1242, a game console, and the display device 1240. As still another example, the client device A or B includes the controller device 1242, a game console, and an HMD. The controller device 1242 communicates with the HMD via a wireless protocol, such as Bluetooth™ or Wi-Fi™. The game console communicates with the HMD via the wireless protocol or via a wired medium, such as a cable, and the controller device 1242 communicates with the game console via the wireless protocol or via a wired medium.

It will be appreciated that a video game is responsive to user inputs, and thus, a similar procedural flow to that described herein for transmission and processing of user input, but in the reverse direction from the client device A or B to the game server 1202, is performed. As shown, the controller device 1242 or another input device, e.g., a body part of the user A, etc., or a combination thereof generates input data 1244. This input data 1244 is packetized at a NIC of the client device A or B for transport over the computer network 1220 to the data center. Input data packets 1246 are unpacked and reassembled by the game server 1202 to define input data 1248 on the data center side. The input data 1248 is fed to the game server 1202, which processes the input data 1248 to update save data for a game state of the video game.

During transport via the computer network 1220 of the audio packets 1216, the video packets 1218, and haptic feedback packets 1224, in some embodiments, the transmission of data over the computer network 1220 is monitored to ensure a quality of service. For example, network conditions of the computer network 1220 are monitored as indicated by reference 1250, including both upstream and downstream network bandwidth, and the game streaming is adjusted in response to changes in available bandwidth. That is, the encoding and decoding of network packets is controlled based on present network conditions, as indicated by reference 1252.

Figure 13:
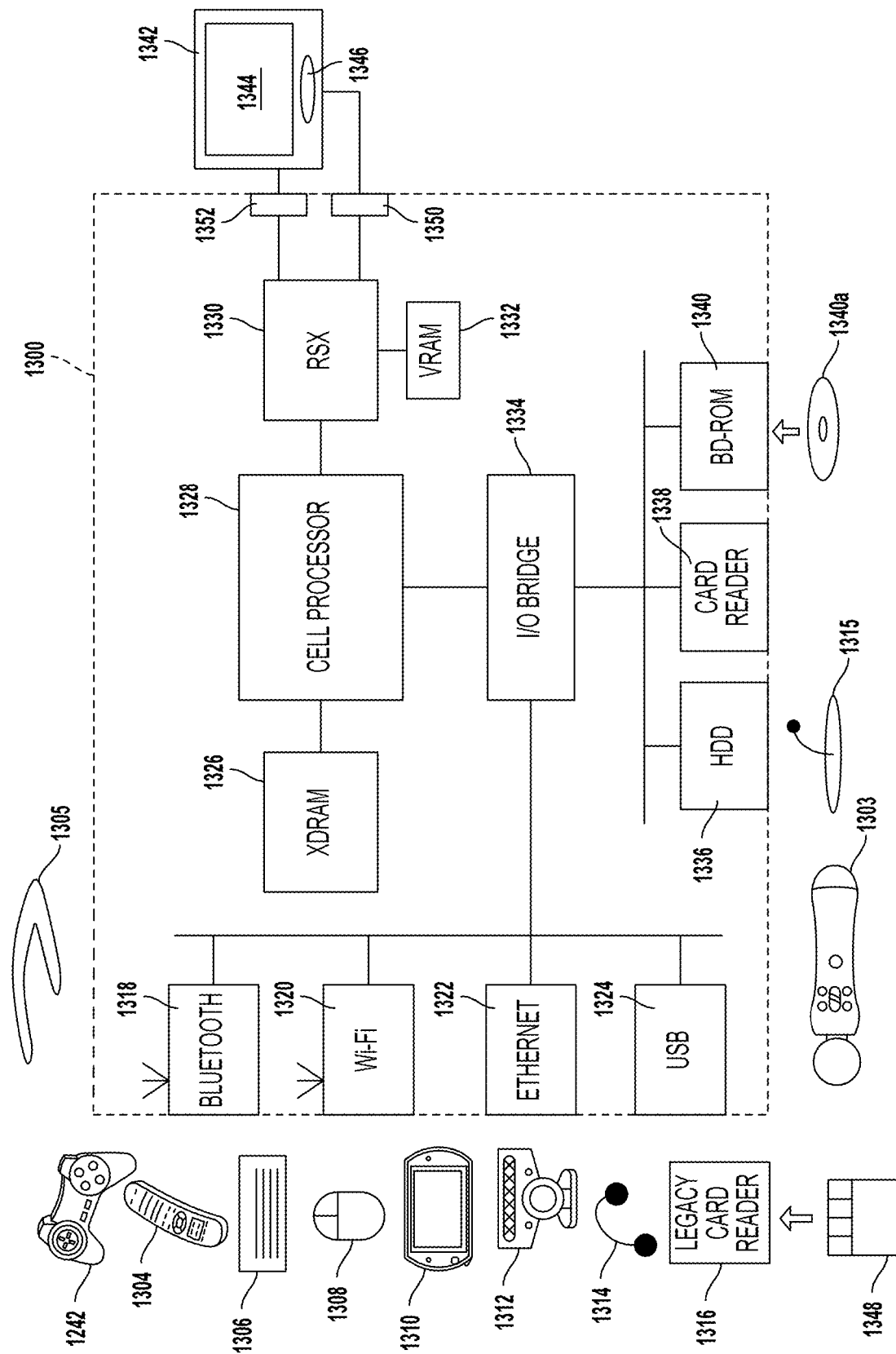
FIG. 13 is a block diagram of an embodiment of a game console that is compatible for interfacing with a display device and is capable of communicating via a computer network with a distributed game engine system.

FIG. 13 is a block diagram of an embodiment of a game console 1300 that is compatible for interfacing with the display device of the client device A or B and is capable of communicating via the computer network 1220 with the game server 1202 (FIG. 12). The game console 1300 is located within the data center or is located at a location at which the user A is located. In some embodiments, the game console 1300 is used to execute a game that is displayed on the client device A or B, such as the HMD. The game console 1300 is provided with various peripheral devices connectable to the game console 1300. The game console 1300 has a dynamic random access memory (XDRAM) unit 1326, a cell processor 1328, a Reality Synthesizer graphics processor (RSX) unit 1330 with a dedicated video random access memory (VRAM) unit 1332, and an input/output (I/O) bridge 1334.

The game console 1300 also has a Blu Ray® Disk read-only memory (BD-ROM) optical disk reader 1340 for reading from a disk 1340a and a removable slot-in hard disk drive (HDD) 1336, accessible through the I/O bridge 1334. Optionally, the game console 1300 also includes a memory card reader 1338 for reading compact flash memory cards, memory Stick® memory cards and the like, which is similarly accessible through the I/O bridge 1334. The I/O bridge 1334 also connects to a Bluetooth® wireless link port 1318, an IEEE 802.9b/g wireless network (Wi-Fi™) port 1320, a gigabit Ethernet port 1322, and Universal Serial Bus (USB) 2.0 ports 1324 capable of supporting Bluetooth® connections.

In operation, the I/O bridge 1334 handles all wireless, USB and Ethernet data, including data from game controllers 1242 and/or 1303, and from an HMD 1305. For example, when the user A is playing a game generated by execution of a portion of the game engine A (FIG. 11), the I/O bridge 1334 receives input data from the game controllers 1242 and/or 1303 and/or from the HMD 1305 via a Bluetooth® link and directs the input data to the cell processor 1328, which updates a current state, such as the variables, of the game accordingly. As an example, a camera within the HMD 1305 captures a gesture of the user A to generate an image representing the gesture. Each game controller 1242 and 1303 is an example of the hand-held controller.

The wireless, USB and Ethernet ports also provide connectivity for other peripheral devices in addition to game controllers 1242 and 1303 and the HMD 1305, such as, for example, a remote control 1304, a keyboard 1306, a mouse 1308, a portable entertainment device 1310, such as, e.g., a Sony Playstation Portable® entertainment device, etc., a video camera 1312, such as, e.g., an EyeToy® video camera, etc., a microphone headset 1314, and a microphone 1315. In some embodiments, such peripheral devices are connected to the game console 1300 wirelessly, for example, the portable entertainment device 1310 communicates via a Wi-Fi™ ad-hoc connection, whilst the microphone headset 1314 communicates via a Bluetooth® link.

The provision of these interfaces means that the game console 1300 is also potentially compatible with other peripheral devices such as digital video recorders (DVRs), set-top boxes, digital cameras, portable media players, Voice over Internet protocol (IP) telephones, mobile telephones, printers and scanners.

In addition, a legacy memory card reader 1316 is connected to the game console 1300 via the USB port 1324, enabling the reading of memory cards 1348 of a kind used by the game console 1300. The game controllers 1242 and 1303 and the HMD 1305 are operable to communicate wirelessly with the game console 1300 via the Bluetooth® link 1318, or to be connected to the USB port 1324, thereby also receiving power by which to charge batteries of the game controller 1242 and 1303 and the HMD 1305. In some embodiments, each of the game controllers 1242 and 1303 and the HMD 1305 includes a memory, a processor, a memory card reader, permanent memory, such as, e.g., flash memory, etc., light emitters such as, e.g., an illuminated spherical section, light emitting diodes (LEDs), or infrared lights, etc., microphone and speaker for ultrasound communications, an acoustic chamber, a digital camera, an internal clock, a recognizable shape, such as, e.g., a spherical section facing the game console 1300, and wireless devices using protocols, such as, e.g., Bluetooth®, Wi-Fi™, etc.

The game controller 1242 is a controller designed to be used with two hands of the user A, and game controller 1303 is a single-hand controller with an attachment. The HMD 1305 is designed to fit on top of a head and/or in front of eyes of the user A. In addition to one or more analog joysticks and conventional control buttons, each game controller 1242 and 1303 is susceptible to three-dimensional location determination. Similarly, the HMD 1305 is susceptible to three-dimensional location determination. Consequently, in some embodiments, gestures and movements by the user A of the game controller 1242 and 1303 and of the HMD 1305 are translated as inputs to the game engine A in addition to or instead of conventional button or joystick commands Optionally, other wirelessly enabled peripheral devices, such as, e.g., the Playstation™ Portable device, etc., are used as a controller. In the case of the Playstation™ Portable device, additional game or control information, e.g., control instructions or number of lives, etc., is provided on a display screen of the device. In some embodiments, other alternative or supplementary control devices are used, such as, e.g., a dance mat (not shown), a light gun (not shown), a steering wheel and pedals (not shown), bespoke controllers, etc.

Examples of bespoke controllers include a single or several large buttons for a rapid-response quiz game (also not shown).

The remote control 1304 is also operable to communicate wirelessly with the game console 1300 via the Bluetooth® link 1318. The remote control 1304 includes controls suitable for the operation of the Blu Ray™ Disk BD-ROM reader 1340 and for navigation of disk content.

The Blu Ray™ Disk BD-ROM reader 1340 is operable to read CD-ROMs compatible with the game console 1300, in addition to conventional pre-recorded and recordable CDs, and so-called Super Audio CDs. The Blu Ray™ Disk BD-ROM reader 1340 is also operable to read digital video disk-ROMs (DVD-ROMs) compatible with the game console 1300, in addition to conventional pre-recorded and recordable DVDs. The Blu Ray™ Disk BD-ROM reader 1340 is further operable to read BD-ROMs compatible with the game console 1300, as well as conventional pre-recorded and recordable Blu-Ray Disks.

The game console 1300 is operable to supply audio and video, either generated or decoded via the Reality Synthesizer graphics unit 1330, through audio connectors 1350 and video connectors 1352 to a display and sound output device 1342, such as, e.g., a monitor or television set, etc., having a display screen 1344 and one or more loudspeakers 1346, or to supply the audio and video via the Bluetooth® wireless link port 1318 to the display device of the HMD 1305. The sound output device 1342 is an example of the display device of the client device A or B. The audio connectors 1350, in various embodiments, include conventional analogue and digital outputs whilst the video connectors 1352 variously include component video, S-video, composite video, and one or more High Definition Multimedia Interface (HDMI) outputs. Consequently, video output may be in formats such as phase alternating line (PAL) or National Television System Committee (NTSC), or in 2220p, 1080i or 1080p high definition. Audio processing, e.g., generation, decoding, etc., is performed by the cell processor 1308. An operating system of the game console 1300 supports Dolby® 5.1 surround sound, Dolby® Theatre Surround (DTS), and the decoding of 7.1 surround sound from Blu-Ray® disks.

In some embodiments, a video camera, e.g., the video camera 1312, etc., comprises a single charge coupled device (CCD), an LED indicator, and hardware-based real-time data compression and encoding apparatus so that compressed video data is transmitted in an appropriate format such as an intra-image based motion picture expert group (MPEG) standard for decoding by the game console 1300. An LED indicator of the video camera 1312 is arranged to illuminate in response to appropriate control data from the game console 1300, for example, to signify adverse lighting conditions, etc. Some embodiments of the video camera 1312 variously connect to the game console 1300 via a USB, Bluetooth® or Wi-Fi™ communication port. Various embodiments of a video camera include one or more associated microphones and also are capable of transmitting audio data. In several embodiments of a video camera, the CCD has a resolution suitable for high-definition video capture. In use, images captured by the video camera are incorporated within a game or interpreted as game control inputs. In another embodiment, a video camera is an infrared camera suitable for detecting infrared light.

In various embodiments, for successful data communication to occur with a peripheral device, such as, for example, a video camera or remote control via one of the communication ports of the game console 1300, an appropriate piece of software, such as, a device driver, etc., is provided.

In some embodiments, the aforementioned system devices, including the game console 1300 and the hand-held controller enable the HMD 1305 to display and capture video of an interactive session of a game. The system devices facilitate execution of the game engine A to initiate an interactive session of a game and the interactive session defines interactivity between the user A and the game. The system devices further determine an initial position and orientation of the hand-held controller and/or the HMD 1305 operated by the user A. The game console 1300 determines the current state of a game based on the interactivity between the user A and the game. The system devices track a position and orientation of the HH hand-held controller C and/or the HMD 1305 during an interactive session of the user A with the game. The system devices generate a spectator video stream of the interactive session based on the current state of the game and the tracked position and orientation of the hand-held controller and/or the HMD 1305. In some embodiments, the hand-held controller renders the spectator video stream on a display screen of the HHC or the display device of the client device A. In various embodiments, the HMD 1305 renders the spectator video stream on a display screen of the HMD 1305.

Figure 14:
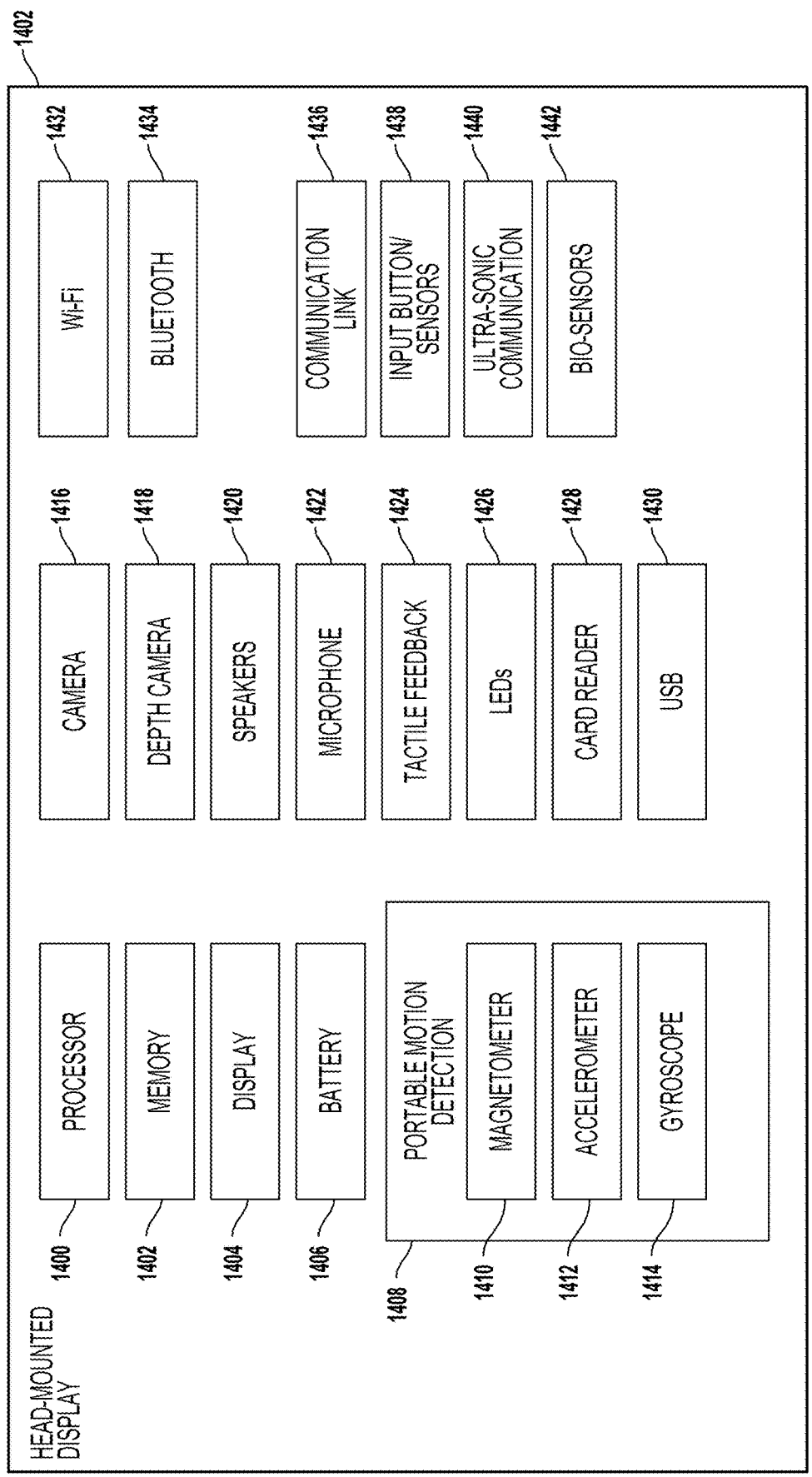
FIG. 14 is a diagram illustrating components of a head-mounted display (HMD), which is an example of the client device of FIG. 10.

With reference to FIG. 14, a diagram illustrating components of an HMD 1402 is shown. The HMD 1402 is an example of the HMD 1305 (FIG. 13). The HMD 1402 includes a processor 1400 for executing program instructions. A memory device 1402 is provided for storage purposes. Examples of the memory device 1402 include a volatile memory, a non-volatile memory, or a combination thereof. A display device 1404 is included which provides a visual interface, e.g., display of image frames generated from save data, etc., that the user A (FIG. 1) views. A battery 1406 is provided as a power source for the HMD 1402. A motion detection circuit 1408 includes any of various kinds of motion sensitive hardware, such as a magnetometer 1410, an accelerometer 1412, and a gyroscope 1414.

An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 1412 are used to provide the direction of gravity, which gives an absolute reference for two angles, e.g., world-space pitch and world-space roll, etc.

A magnetometer measures strength and direction of a magnetic field in a vicinity of the HMD 1402. In some embodiments, three magnetometers 1410 are used within the HMD 1402, ensuring an absolute reference for the world-space yaw angle. In various embodiments, the magnetometer is designed to span the earth magnetic field, which is ±80 microtesla. Magnetometers are affected by metal, and provide a yaw measurement that is monotonic with actual yaw. In some embodiments, a magnetic field is warped due to metal in the real-world environment, which causes a warp in the yaw measurement. In various embodiments, this warp is calibrated using information from other sensors, e.g., the gyroscope 1414, a camera 1416, etc. In one embodiment, the accelerometer 1412 is used together with magnetometer 1410 to obtain the inclination and azimuth of the HMD 1402.

A gyroscope is a device for measuring or maintaining orientation, based on the principles of angular momentum. In one embodiment, instead of the gyroscope 1414, three gyroscopes provide information about movement across the respective axis (X, Y, and Z) based on inertial sensing. The gyroscopes help in detecting fast rotations. However, the gyroscopes, in some embodiments, drift overtime without the existence of an absolute reference. This triggers resetting the gyroscopes periodically, which can be done using other available information, such as positional/orientation determination based on visual tracking of an object, accelerometer, magnetometer, etc.

The camera 1416 is provided for capturing images and image streams of a real-world environment, e.g., room, cabin, natural environment, etc., surrounding the user A. In various embodiments, more than one camera is included in the HMD 1402, including a camera that is rear-facing, e.g., directed away from the user A when the user A is viewing the display of the HMD 1402, etc., and a camera that is front-facing, e.g., directed towards the user A when the user A is viewing the display of the HMD 1402, etc. Additionally, in several embodiments, a depth camera 1418 is included in the HMD 1402 for sensing depth information of objects in the real-world environment.

The HMD 1402 includes speakers 1420 for providing audio output. Also, a microphone 1422 is included, in some embodiments, for capturing audio from the real-world environment, including sounds from an ambient environment, and speech made by the user A, etc. The HMD 1402 includes a tactile feedback circuit 1424, e.g., a vibration device, etc., for providing tactile feedback to the user A. In one embodiment, the tactile feedback circuit 1424 is capable of causing movement and/or vibration of the HMD 1402 to provide tactile feedback to the user A.

LEDs 1426 are provided as visual indicators of statuses of the HMD 1402. For example, an LED may indicate battery level, power on, etc. A card reader 1428 is provided to enable the HMD 1402 to read and write information to and from a memory card. A USB interface 1430 is included as one example of an interface for enabling connection of peripheral devices, or connection to other devices, such as other portable devices, computers, etc. In various embodiments of the HMD 1402, any of various kinds of interfaces may be included to enable greater connectivity of the HMD 1402.

A Wi-Fi™ circuit 1432 is included for enabling connection to the Internet via wireless networking technologies. Also, the HMD 1402 includes a Bluetooth™ circuit 1434 for enabling wireless connection to other devices. A communications link 1436 is also included, in some embodiments, for connection to other devices. In one embodiment, the communications link 1436 utilizes infrared transmission for wireless communication. In other embodiments, the communications link 1436 utilizes any of various wireless or wired transmission protocols for communication with other devices.

Input buttons/sensors 1438 are included to provide an input interface for the user A (FIG. 1). Any of various kinds of input interfaces are included, such as buttons, touchpad, joystick, trackball, etc. An ultra-sonic communication circuit 1440 is included, in various embodiments, in the HMD 1402 for facilitating communication with other devices via ultrasonic technologies.

Bio-sensors 1442 are included to enable detection of physiological data from the user A or B. In one embodiment, the bio-sensors 1442 include one or more dry electrodes for detecting bio-electric signals of the user A or B through the user's skin.

The foregoing components of HMD 1402 have been described as merely exemplary components that may be included in HMD 1402. In various embodiments, the HMD 1402 include or do not include some of the various aforementioned components.

Figure 15:
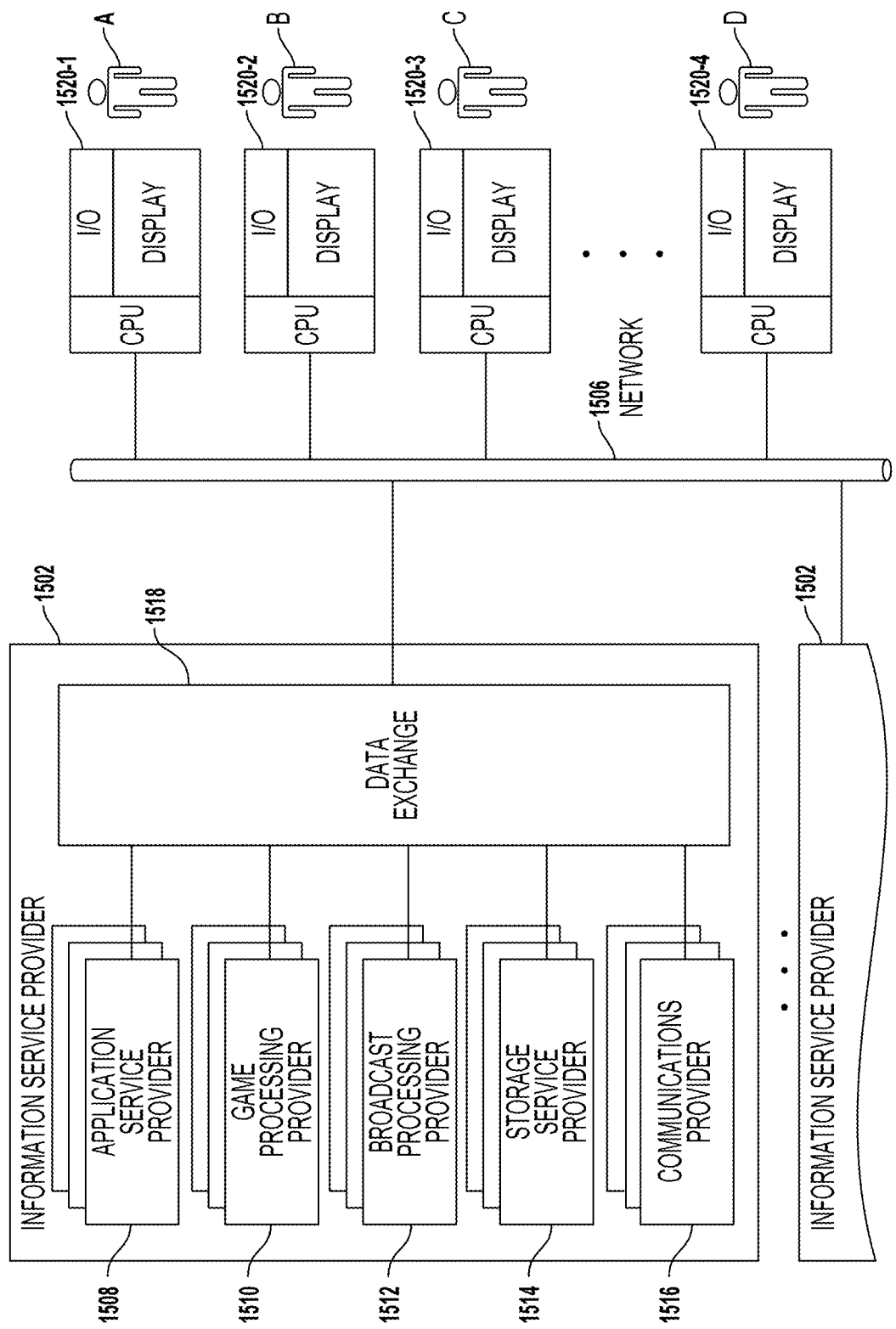
FIG. 15 illustrates an embodiment of an Information Service Provider (INSP) architecture.

FIG. 15 illustrates an embodiment of an Information Service Provider (INSP) architecture. INSPs 1502 delivers a multitude of information services to users A, B, C, and D geographically dispersed and connected via a computer network 1506, e.g., a LAN, a WAN, or a combination thereof, etc. The computer network 1506 is an example of the computer network 1110 (FIG. 11). The user A operates a client device 1520-1, the user B operates another client device 1520-2, the user C operates yet another client device 1520-3, and the user D operates another client device 1520-4.

In some embodiments, each client device 1520-1, 1520-2, 1520-3, and 1520-4 includes a CPU, a display, and an I/O interface. Examples of each client device 1520-1, 1520-2, 1520-3, and 1520-4 include a personal computer (PC), a mobile phone, a netbook, a tablet, a gaming system, a personal digital assistant (PDA), the game console 1300 (FIG. 13) and a display device, the HMD 1402 (FIG. 14), the game console 1300 and the HMD 1402, a desktop computer, a laptop computer, a smart television, etc. Each client device 1520-1, 1520-2, 1520-3, and 1520-4 is an example of the client device A (FIG. 11) or client device B (FIG. 11). In some embodiments, the INSP 1502 recognizes a type of a client device and adjusts a communication method employed.

In some embodiments, an INSP delivers one type of service, such as stock price updates, or a variety of services such as broadcast media, news, sports, gaming, etc. Additionally, the services offered by each INSP are dynamic, that is, services can be added or taken away at any point in time. Thus, an INSP providing a particular type of service to a particular individual can change over time. For example, the client device 1520-1 is served by an INSP in near proximity to the client device 1520-1 while the client device 1520-1 is in a home town of the user A, and client device 1520-1 is served by a different INSP when the user A travels to a different city. The home-town INSP will transfer requested information and data to the new INSP, such that the information "follows" the client device 1520-1 to the new city making the data closer to the client device 1520-1 and easier to access. In various embodiments, a master-server relationship is established between a master INSP, which manages the information for the client device 1520-1, and a server INSP that interfaces directly with the client device 1520-1 under control from the master INSP. In some embodiments, data is transferred from one ISP to another ISP as the client device 1520-1 moves around the world to make the INSP in better position to service client device 1520-1 be the one that delivers these services.

The INSP 1502 includes an Application Service Provider (ASP) 1508, which provides computer-based services to customers over the computer network 1506. Software offered using an ASP model is also sometimes called on-demand software or software as a service (SaaS). A simple form of providing access to a computer-based service, e.g., customer relationship management, etc., is by using a standard protocol, e.g., a hypertext transfer protocol (HTTP), etc. The application software resides on a vendor's server and is accessed by each client device 1520-1, 1520-2, 1520-3, and 1520-4 through a web browser using a hypertext markup language (HTML), etc., by a special purpose client software provided by the vendor, and/or other remote interface, e.g., a thin client, etc.

Services delivered over a wide geographical area often use cloud computing. Cloud computing is a style of computing in which dynamically scalable and often virtualized resources are provided as a service over the computer network 1506. The users A, B, C, and D do not need to be an expert in the technology infrastructure in the "cloud" that supports them. Cloud computing is divided, in some embodiments, in different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the computer network 1506, e.g., using servers, storage and logic, etc., based on how the computer network 1506 is depicted in computer network diagrams and is an abstraction for the complex infrastructure it conceals.

Further, the INSP 1502 includes a game processing provider (GPP) 1510, also sometime referred to herein as a game processing server, which is used by the client devices 1520-1, 1520-2, 1520-3, and 1520-4 to play single and multiplayer video games. Most video games played over the computer network 1506 operate via a connection to a game server. Typically, games use a dedicated server application that collects data from the client devices 1520-1, 1520-2, 1520-3, and 1520-4 and distributes it to other clients that are operated by other users. This is more efficient and effective than a peer-to-peer arrangement, but a separate server is used to host the server application. In some embodiments, the GPP 1510 establishes communication between the client devices 1520-1, 1520-2, 1520-3, and 1520-4, which exchange information without further relying on the centralized GPP 1510.

Dedicated GPPs are servers which run independently of a client. Such servers are usually run on dedicated hardware located in data centers, providing more bandwidth and dedicated processing power. Dedicated servers are a method of hosting game servers for most PC-based multiplayer games. Massively multiplayer online games run on dedicated servers usually hosted by the software company that owns the game title, allowing them to control and update content.

A broadcast processing server (BPS) 1512, sometimes referred to herein as a broadcast processing provider, distributes audio or video signals to an audience. Broadcasting to a very narrow range of audience is sometimes called narrowcasting. A final leg of broadcast distribution is how a signal gets to the client devices 1520-1, 1520-2, 1520-3, and 1520-4, and the signal, in some embodiments, is distributed over the air as with a radio station or a television station to an antenna and receiver, or through a cable television or cable radio or "wireless cable" via the station. The computer network 1506 also brings, in various embodiments, either radio or television signals to the client devices 1520-1, 1520-2, 1520-3, and 1520-4, especially with multicasting allowing the signals and bandwidth to be shared. Historically, broadcasts are delimited, in several embodiments, by a geographic region, e.g., national broadcasts, regional broadcasts, etc. However, with the proliferation of high-speed Internet, broadcasts are not defined by geographies as content can reach almost any country in the world.

A storage service provider (SSP) 1514 provides computer storage space and related management services. The SSP 1514 also offers periodic backup and archiving. By offering storage as a service, the client devices 1520-1, 1520-2, 1520-3, and 1520-4 use more storage compared to when storage is not used as a service. Another major advantage is that the SSP 1514 includes backup services and the client devices 1520-1, 1520-2, 1520-3, and 1520-4 will not lose data if their hard drives fail. Further, a plurality of SSPs, in some embodiments, have total or partial copies of the data received from the client devices 1520-1, 1520-2, 1520-3, and 1520-4, allowing the client devices 1520-1, 1520-2, 1520-3, and 1520-4 to access data in an efficient way independently of where the client devices 1520-1, 1520-2, 1520-3, and 1520-4 are located or of types of the clients. For example, the user A accesses personal files via a home computer, as well as via a mobile phone while the user A is on the move.

A communications provider 1516 provides connectivity to the client devices 1520-1, 1520-2, 1520-3, and 1520-4. One kind of the communications provider 1516 is an Internet service provider (ISP) which offers access to the computer network 1506. The ISP connects the client devices 1520-1, 1520-2, 1520-3, and 1520-4 using a data transmission technology appropriate for delivering Internet Protocol datagrams, such as dial-up, digital subscriber line (DSL), cable modem, fiber, wireless or dedicated high-speed interconnects. The communications provider 1516 also provides, in some embodiments, messaging services, such as e-mail, instant messaging, and short message service (SMS) texting. Another type of a communications Provider is a network service provider (NSP), which sells bandwidth or network access by providing direct backbone access to the computer network 1506. Examples of network service providers include telecommunications companies, data carriers, wireless communications providers, Internet service providers, cable television operators offering high-speed Internet access, etc.

A data exchange 1518 interconnects the several circuits inside INSP 1502 and connects these circuits to the client devices 1520-1, 1520-2, 1520-3, and 1520-4 via computer network 1506. The data exchange 1518 covers, in various embodiments, a small area where all the circuits of INSP 1502 are in close proximity, or covers a large geographic area when the different circuits are geographically dispersed. For example, the data exchange 1502 includes a fast Gigabit Ethernet within a cabinet of a data center, or an intercontinental virtual LAN.

In some embodiments, communication between the server system and the client devices A and B may be facilitated using wireless technologies. Such technologies may include, for example, 5G wireless communication technologies. 5G is the fifth generation of cellular network technology. 5G networks are digital cellular networks, in which the service area covered by providers is divided into small geographical areas called cells. Analog signals representing sounds and images are digitized in the telephone, converted by an analog-to-digital converter and transmitted as a stream of bits. All the 5G wireless devices in a cell communicate by radio waves with a local antenna array and low power automated transceiver (transmitter and receiver) in the cell, over frequency channels assigned by the transceiver from a pool of frequencies that are reused in other cells. The local antennas are connected with the telephone network and the Internet by a high bandwidth optical fiber or wireless backhaul connection. As in other cell networks, a mobile device crossing from one cell to another is automatically transferred to the new cell. It should be understood that 5G networks are just an example type of communication network, and embodiments of the disclosure may utilize earlier generation wireless or wired communication, as well as later generation wired or wireless technologies that come after 5G.

It should be noted that in various embodiments, one or more features of some embodiments described herein are combined with one or more features of one or more of remaining embodiments described herein.

Embodiments described in the present disclosure may be practiced with various computer system configurations including hand-held devices, microprocessor systems, microprocessor-based or programmable consumer electronics, minicomputers, mainframe computers and the like. In one implementation, the embodiments described in the present disclosure are practiced in distributed computing environments where tasks are performed by remote processing devices that are linked through a wire-based or wireless network.

With the above embodiments in mind, it should be understood that, in one implementation, the embodiments described in the present disclosure employ various computer-implemented operations involving data stored in computer systems. These operations are those requiring physical manipulation of physical quantities. Any of the operations described herein that form part of the embodiments described in the present disclosure are useful machine operations. Some embodiments described in the present disclosure also relate to a device or an apparatus for performing these operations. The apparatus is specially constructed for the required purpose, or the apparatus is a general-purpose computer selectively activated or configured by a computer program stored in the computer. In particular, in one embodiment, various general-purpose machines are used with computer programs written in accordance with the teachings herein, or it may be more convenient to construct a more specialized apparatus to perform the required operations.

In an implementation, some embodiments described in the present disclosure are embodied as computer-readable code on a computer-readable medium. The computer-readable medium is any data storage device that stores data, which is thereafter read by a computer system. Examples of the computer-readable medium include a hard drive, a network-attached storage (NAS), a ROM, a RAM, a compact disc ROM (CD-ROM), a CD-recordable (CD-R), a CD-rewritable (CD-RW), a magnetic tape, an optical data storage device, a non-optical data storage device, etc. As an example, a computer-readable medium includes computer-readable tangible medium distributed over a network-coupled computer system so that the computer-readable code is stored and executed in a distributed fashion.

Moreover, although some of the above-described embodiments are described with respect to a gaming environment, in some embodiments, instead of a game, other environments, e.g., a video conferencing environment, etc., is used.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments described in the present disclosure have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

The invention claimed is:

1. A method for decoding image frames at a client, comprising:
generating an estimated image frame after receiving an encoded image frame of a stream of encoded image frames and before a corresponding image frame arrives within the stream;
decoding the encoded image frame when the encoded image frame is received at a decode interval set for a frame rate of presentation; and
using the estimated image frame when the corresponding image frame fails to arrive within the stream for presentation at the frame rate.

2. The method of claim 1, further comprising:
generating another estimated image frame from information within the estimated image frame;
determining that an encoded image frame associated with the other estimated frame has failed to arrive;
using the other estimated image frame at the client.

3. The method of claim 2, wherein the other estimated image frame is generated by applying motion compensation to the estimated image frame.

4. The method of claim 2, wherein the encoded image frames include a plurality of received image frames and a plurality of unreceived image frames, wherein the estimated image frame is generated by applying motion compensation to information within one or more of the plurality of received image frames, the method further comprising:
determining that the plurality of unreceived image frames exceed a pre-determined threshold, wherein the plurality of unreceived image frames are designated to be received after the plurality of received image frames are received;
generating an additional estimated image frame by applying motion compensation and machine learning to the other estimated image frame upon determining that the plurality of unreceived image frames exceed the pre-determined threshold, wherein the additional estimated image frame and the other estimated image frame are generated after the estimated image frame is generated.

5. The method of claim 4, further comprising:
determining that the plurality of unreceived image frames exceed a pre-set limit;
generating a further estimated image frame by applying machine learning to the additional estimated image frame upon determining that the plurality of unreceived image frames exceed the pre-set limit.

6. The method of claim 1, wherein the encoded image frames includes a plurality of received image frames and a plurality of unreceived image frames, wherein the estimated image frame is generated using information from one or more of the received image frames of the stream.

7. The method of claim 1, wherein the estimated image frame is an approximation of changes likely to occur in the corresponding image frame.

8. The method of claim 1, wherein said using the estimated image frame comprises displaying the estimated image frame, wherein the estimated image frame is generated and displayed in a time interval that is less than a time interval for encoding, sending, decoding, and displaying the corresponding image frame.

9. The method of claim 1, wherein each of the corresponding image frame and the encoded image frame is an I-frame, a P-frame, or a B-frame.

10. The method of claim 1, wherein the corresponding image frame is received at the client immediately following a reception of the encoded image frame at the client, wherein the corresponding image frame is encoded when received at the client, wherein the estimated image frame is generated based on information in the encoded image frame, wherein said using the estimated image frame includes displaying information within the estimated image frame instead of information within the corresponding image frame.

11. A method for decoding image frames at a client, comprising:
generating an estimated image frame after receiving an encoded image frame of a stream of encoded image frames;
decoding the encoded image frame when the encoded image frame is received at a decode interval set for a frame rate of presentation; and
using the estimated image frame when a corresponding encoded image frame fails to arrive within the stream for presentation at the frame rate,
wherein the corresponding encoded image frame fails to arrive within the stream when the corresponding encoded image frame arrives late to be unable to satisfy the frame rate of presentation.

12. A method for decoding image frames at a client, comprising:
generating an estimated image frame after receiving an encoded image frame of a stream of encoded image frames;
decoding the encoded image frame when the encoded image frame is received at a decode interval set for a frame rate of presentation;
using the estimated image frame when a corresponding encoded image frame fails to arrive within the stream for presentation at the frame rate;
receiving the corresponding encoded image frame, wherein the corresponding encoded image frame is received to not satisfy the frame rate of presentation; and
dropping the corresponding encoded image frame.

13. A client device for decoding image frames at a client, comprising:
a processor configured to:
generate an estimated image frame after receiving an encoded image frame of a stream of encoded image frames and before a corresponding image frame arrives within the stream;
decode the encoded image frame of the stream when the encoded image frame is received at a decode interval set for a frame rate of presentation; and
use the estimated image frame when the corresponding image frame fails to arrive within the stream for presentation at the frame rate; and
a memory device coupled to the processor.

14. The client device of claim 13, wherein the processor is configured to:
generate another estimated image frame from information within the estimated image frame;
determine that an encoded image frame associated with the other estimated frame has failed to arrive;
use the other estimated image frame at the client.

15. The client device of claim 14, wherein the other estimated image frame is generated by applying motion compensation to the estimated image frame.

16. The client device of claim 14, wherein the encoded image frames includes a plurality of received image frames and a plurality of unreceived image frames, wherein the estimated image frame is generated by applying motion compensation to information within one or more of the plurality of received image frames, wherein the processor is configured to:
determine that the plurality of unreceived image frames exceed a predetermined threshold, wherein the plurality of unreceived image frames are designated to be received after the plurality of received image frames are received;
generate an additional estimated image frame by applying motion compensation and machine learning to the other estimated image frame upon determining that the plurality of unreceived image frames exceed the predetermined threshold, wherein the additional estimated image frame and the other estimated image frame are generated after the estimated image frame is generated.

17. The client device of claim 16, wherein the processor is configured to:
determine that the plurality of unreceived image frames exceed a preset limit;
generate a further estimated image frame by applying machine learning to the additional estimated image frame upon determining that the plurality of unreceived image frames exceed the preset limit.

18. A non-transitory computer-readable medium containing program instructions for decoding image frames at a client, wherein execution of the program instructions by one or more processors of a computer system causes the one or more processors to carry a plurality of operations including:
generating an estimated image frame after receiving an encoded image frame of a stream of encoded image frames and before a corresponding image frame arrives within the stream;
decoding the encoded image frame of the stream when the encoded image frame is received at a decode interval set for a frame rate of presentation; and
using the estimated image frame when the corresponding image frame fails to arrive within the stream for presentation at the frame rate.

19. The non-transitory computer-readable medium of claim 18, wherein the operations further comprise:
generating another estimated image frame from information within the estimated image frame;
determining that an encoded image frame associated with the other estimated frame has failed to arrive;
using the other estimated image frame at the client.

20. The non-transitory computer-readable medium of claim 19, wherein the other estimated image frame is generated by applying motion compensation to the estimated image frame.

21. The non-transitory computer-readable medium of claim 19, wherein the encoded image frames includes a plurality of received image frames and a plurality of unreceived image frames, wherein the estimated image frame is generated by applying motion compensation to information within one or more of the plurality of received image frames, wherein the operations further comprise:
determining that the plurality of unreceived image frames exceed a predetermined threshold, wherein the plurality of unreceived image frames are designated to be received after the plurality of received image frames are received;
generating an additional estimated image frame by applying motion compensation and machine learning to the other estimated image frame upon determining that the plurality of unreceived image frames exceed the predetermined threshold, wherein the additional estimated image frame and the other estimated image frame are generated after the estimated image frame is generated.

* * * * *